United States Patent
Ha et al.

(10) Patent No.: US 10,872,209 B2
(45) Date of Patent: Dec. 22, 2020

(54) METHODS AND APPARATUS FOR RADIO FREQUENCY SENSING IN DIVERSE ENVIRONMENTS

(71) Applicant: Massachusetts Institute of Technology, Cambridge, MA (US)

(72) Inventors: Unsoo Ha, Cambridge, MA (US); Junshan Leng, Boston, MA (US); Alaa Khaddaj, Kfarmatta (LB); Yunfei Ma, Santa Clara, CA (US); Tzu Ming Hsu, Cambridge, MA (US); Zexuan Zhong, Princeton, NJ (US); Fadel Adib, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/601,584

(22) Filed: Oct. 15, 2019

(65) Prior Publication Data

US 2020/0117863 A1    Apr. 16, 2020

Related U.S. Application Data

(60) Provisional application No. 62/745,344, filed on Oct. 13, 2018.

(51) Int. Cl.
 *G06K 7/00* (2006.01)
 *G06K 19/07* (2006.01)
 *G06K 7/10* (2006.01)

(52) U.S. Cl.
 CPC ....... *G06K 7/0008* (2013.01); *G06K 7/10009* (2013.01); *G06K 19/0723* (2013.01)

(58) Field of Classification Search
 CPC .................................................. G01S 5/0054
 (Continued)

(56) References Cited

U.S. PATENT DOCUMENTS

| 4,765,179 A | 8/1988 | Fuller et al. |
| 5,792,668 A | 8/1998 | Fuller et al. |

(Continued)

OTHER PUBLICATIONS

Antoniou, A. et al., Data Augmentation Generative Adversarial Networks; published in arXiv at arXiv:1711.04340v3, Mar. 21, 2018.

(Continued)

*Primary Examiner* — Fabricio R Murillo Garcia
(74) *Attorney, Agent, or Firm* — Stephen R. Otis

(57) ABSTRACT

A system may sense the contents of a closed container, by analyzing a wireless signal that reflects from an RFID tag on the outside of the container. The frequency response of the tag's antenna may be affected by the relative permittivity of the contents and by the tag's environment. The frequency response may be measured in a line-of-sight environment and in a multipath environment. Channel estimates may be calculated, based on the measurements. Channel ratios may be calculated by dividing line-of-sight channel estimates by multipath channel estimates. The resulting channel ratios may be fed into a variational autoencoder, which in turn generates synthetic data that contains information about multipath environments but not the contents. The output of the variational autoencoder may be converted into synthetic channel estimates, which may in turn be employed for anomaly detection, or to train a classifier to classify contents of the container.

9 Claims, 16 Drawing Sheets

(58) Field of Classification Search
USPC .................................................... 340/572.1
See application file for complete search history.

(56) References Cited

U.S. PATENT DOCUMENTS

| | | | |
|---|---|---|---|
| 6,359,444 B1 | 3/2002 | Grimes | |
| 9,037,418 B2 | 5/2015 | Potyrailo et al. | |
| 2007/0208456 A1* | 9/2007 | Uland | G06Q 10/08 700/225 |
| 2008/0041947 A1* | 2/2008 | Hollister | G06Q 10/08 235/385 |
| 2010/0234045 A1* | 9/2010 | Karr | G01S 1/026 455/456.1 |

OTHER PUBLICATIONS

Asami, K., Characterization of heterogeneous systems by dielectric spectroscopy; published in Progress in Polymer Science, vol. 27, Issue 8, pp. 1617-1659, Oct. 2002.

Battacharyya, R., et al., Towards tag antenna based sensing—An RFID displacement sensor; published in 2009 IEEE International Conference on RFID, Apr. 2009.

Battacharyya, R., et al., Low-Cost, Ubiquitous RFID-Tag-Antenna-Based Sensing; published in Proceedings of the IEEE ( vol. 98 , Issue: 9 , Sep. 2010 ).

Chenwei, Y., et al., UHF RFID tag sensitive to object material; published in 2015 Loughborough Antennas & Propagation Conference (LAPC), Nov. 2015.

Goodfellow, I., et al., Generative Adversarial Nets, published in arXiv at arXiv:1406.2661v1 (Jun. 10, 2014).

Griffin, J., et al., Radio link budgets for 915 MHz RFID antennas placed on various objects; published in Proceedings 2005 Texas Wireless Symposium, 2005.

Higgins, I., et al., beta-VAE: Learning Basic Visual Concepts with a Constrained Variational Framework; published as conference paper at ICLR 2017.

Khan, U., et al., Compact RFID Enabled Moisture Sensor; published in Radioengineering, vol. 25, No. 3, Sep. 2016.

Kingma, D., et al., Auto-Encoding Variational Bayes; published in arXiv at arXiv:1312.6114v10 on May 1, 2014.

Makhzani, A., et al., Adversarial Autoencoders, published in arXiv at arXiv:1511.05644v2 on May 25, 2016.

Mirza, M., et al., Conditional Generative Adversarial Nets, published in arXiv at arXiv:1411.1784v1 on Nov. 6, 2014.

Nguyen, S., et al., Approach for quality detection of food by RFID-based wireless sensor tag; published in Electronics Letters, vol. 49, Issue 25, pp. 1588-1589, Dec. 2013.

Van Den Oord, A., et al., Neural Discrete Representation Learning; published in arXiv at arXiv:1711.00937v2 on May 30, 2018.

Razavi, A., et al., Generating Diverse High-Fidelity Images with VQ-VAE-2; published in arXiv at arXiv:1906.00446v1 on Jun. 2, 2019.

Rezende, D., et al., Stochastic Backpropagation and Approximate Inference in Deep Generative Models; published in arXiv at arXiv:1401.4082v3 on May 30, 2014.

Suwalek, R., et al., Determination of Dielectric Property of Construction Material Products Using a Novel RFID Sensor, published in Progress in Electromagnetics Research, vol. 130, 601-617, 2012.

Wang, J., et al., TagScan: Simultaneous Target Imaging and Material Identification with Commodity RFID Devices; published in Proceedings of the 23rd Annual International Conference on Mobile Computing and Networking, MobiCom '17, pp. 288-300, Oct. 2017.

Yang, C., et al., AutoTag: Recurrent Variational Autoencoder for Unsupervised Apnea Detection with RFID Tags; published in 2018 IEEE Global Communications Conference (GLOBECOM), Dec. 2018.

Yang, C., et al., Unsupervised Detection of Apnea Using Commodity RFID Tags With a Recurrent Variational Autoencoder; published in IEEE Access (vol. 7), pp. 67526-67538, May 2019.

Zhang, J., et al., UHF RFID Tag Antenna-Based Sensing for Corrosion Detection & Characterization Using Principal Component Analysis; published in IEEE Transactions on Antennas and Propagation, vol. 64, Issue 10, pp. 4405-4414, Aug. 2016.

\* cited by examiner

Algorithm for VAE-based anomaly sample detection

Input: authentic dataset x, anomalous dataset $x_i$ ($i = 1,...,N$), threshold $\alpha$ Output: reconstruction probability $P_R$ Train a variational autoencoder using the authentic dataset x
    Trained encoder $E_\theta$ and decoder $D_\phi$
    for $i = 1$ to N do
        $\mu_{z(i)}, \sigma_{z(i)} = E_\theta(z|x_i)$
        draw $L$ samples from $z \sim N(\mu_{z(i)}, \sigma_{z(i)})$
        for $l = 1$ to L do
            $\hat{x}_{(i,l)} = D_\phi(z|x_{(i,l)})$
        $P_{R(i)} = \frac{1}{L} \Sigma_{l=1}^{L} \mathcal{L}(x, \hat{x}_{(i,l)})$
        if $P_{R(i)} > \alpha$ then
            $x_i$ is an anomaly
        else
            $x_i$ is not an anomaly

FIG. 8

EMPLOY WIDE-BAND SENSING TO MEASURE FREQUENCY RESPONSES FROM AN RFID TAG ATTACHED TO THE OUTSIDE OF A CONTAINER, INCLUDING FREQUENCY RESPONSES FOR VARIOUS CONTENTS OF THE CONTAINER. IN THE WIDE-BAND SENSING, A FIRST RADIO SIGNAL POWERS THE RFID TAG AND A SECOND RADIO SIGNAL IS EMPLOYED FOR SENSING. THE FIRST SIGNAL IS TRANSMITTED AT A HIGH POWER AT A FREQUENCY IN THE UHF ISM BAND. THE SECOND SIGNAL MAY BE TRANSMITTED AT A LOW POWER IN A DIFFERENT, MUCH WIDER FREQUENCY BAND.

↓ 901

CALCULATE CHANNEL RATIOS, BASED ON THE MEASUREMENTS. FEED THE CHANNEL RATIOS INTO A VARIATIONAL AUTOENCODER (VAE). CALCULATE SYNTHETIC CHANNEL ESTIMATES BY EMBEDDING, INTO THE OUTPUT OF THE VAE, INFORMATION ABOUT CONTENTS OF THE CONTAINER.

↓ 902

EMPLOY A TRAINING DATASET TO TRAIN A NEURAL NETWORK. THE TRAINING DATASET INCLUDES BOTH THE SYNTHETIC CHANNEL ESTIMATES AND CHANNEL ESTIMATES DERIVED FROM ACTUAL MEASUREMENTS.

↓ 903

ONCE THE NEURAL NETWORK HAS BEEN TRAINED, EMPLOY WIDE-BAND SENSING TO MEASURE A FREQUENCY RESPONSE FROM AN RFID TAG ATTACHED TO THE OUTSIDE OF A CONTAINER THAT CONTAINS UNKNOWN CONTENT. CALCULATE NEW CHANNEL ESTIMATES, BASED ON THE NEW MEASUREMENTS. FEED THE NEW CHANNEL ESTIMATES INTO THE TRAINED NEURAL NETWORK. THE TRAINED NEURAL NETWORK CLASSIFIES THE UNKNOWN CONTENT.

↓ 904

AFTER A FIRST NEURAL NETWORK IS TRAINED TO PERFORM A FIRST CLASSIFICATION TASK, A SECOND NEURAL NETWORK MAY BE TRAINED TO PERFORM A SECOND CLASSIFICATION TASK, IN SUCH A WAY THAT WEIGHTS OF SOME BUT NOT ALL LAYERS OF THE SECOND NEURAL NETWORK (A) ARE SET EQUAL TO WEIGHTS OF CORRESPONDING LAYERS OF THE FIRST NEURAL LAYER AND (B) AFTER BEING SET, REMAIN CONSTANT DURING THE TRAINING OF THE SECOND NEURAL NETWORK.

METHODS AND APPARATUS FOR RADIO FREQUENCY SENSING IN DIVERSE ENVIRONMENTS

RELATED APPLICATIONS

This application claims the benefit of U.S. Provisional Application No. 62/745,344 filed Oct. 13, 2018 (the "Provisional").

STATEMENT REGARDING FEDERALLY SPONSORED RESEARCH OR DEVELOPMENT

This invention was made with government support under Grant No. 1739723 awarded by the National Science Foundation. The government has certain rights in the invention.

FIELD OF TECHNOLOGY

The present invention relates generally to radio frequency (RF) sensing.

SUMMARY

In illustrative implementations of this invention, a system senses the contents of a closed container, by analyzing a wireless signal that reflects from an RFID tag that is on the outside of the container. The contents of the container may be in the near field of the RFID tag's antenna. Thus, weak coupling may occur between the contents and the tag's antenna. The magnitude and distribution of this weak coupling may be affected by the relative permittivity of the contents of the container. The relative permittivity is an intrinsic property of the contents, and depends on the material composition of the contents. The relative permittivity of the contents may affect the gain and frequency response of the RFID tag's antenna. By analyzing minute changes in the frequency response of the tag, the system may detect the material composition of the contents of the container. Thus, the system may sense the contents of a closed container in a non-invasive manner, without opening the container.

This invention has many practical applications, including in the fields of food safety and consumer safety. For instance, this invention may be employed to detect whether the contents of a closed bottle are alcohol fit for human consumption (e.g., grain alcohol) or a poisonous alcohol (e.g., methanol). Or, for instance, this invention may be employed to detect whether the contents of a closed container are an actual medicine (e.g., acetaminophen) or a poisonous component of antifreeze (e.g., diethylene glycol).

The system may employ two wireless radio frequency (RF) signals. The first RF signal may be employed to power up the RFID tag and to communicate with the tag. The second RF signal may be employed to measure the tag's frequency response.

The system may include a wideband transceiver, which transmits the second signal. The system may also include a conventional RFID reader, which transmits the first signal.

The RFID reader may transmit the first signal in a relatively narrow frequency band, such as the ISM 902 MHz-928 MHz band. The first signal may be employed to power up the tag. For instance, the RFID tag may be a passive tag without a battery. The tag may harvest wireless power from the first signal. The first signal may also be employed to communicate with the tag (e.g., by communications in accordance with the EPC-Gen2 protocol). The tag may modulate the reflection of the first signal from the tag, in order to communicate. For instance, the reader may, when transmitting the first signal, modulate the first signal in such a way as to transmit a query. Likewise, the tag may modulate a reflection of the first signal from an antenna of the tag, in such a way as to transmit a reply.

The wideband transceiver may transmit the second signal in a different, much wider frequency band, in order to measure the tag's frequency response over this wide band. For instance, the wideband transceiver may transmit in the 500 MHz to 1 GHz band, at 26 different frequencies with 20 MHz steps between frequencies. The second signal may be a much lower power than the first signal. The wideband transceiver may frequency hop, in order to transmit at different frequencies in the wide frequency band. Alternatively, the wideband transceiver may employ OFDM (orthogonal frequency-division multiplexing) to transmit in the wide frequency band. Or the wideband transceiver may transmit a spread spectrum signal in the wide frequency band.

In illustrative implementations, the measured signal at the transceiver is impacted by both (a) the relative permittivity of the contents of the container; and (b) the wireless RF propagation environment in which the tag and wideband transceiver are located. For instance, in some cases, the RF environment is a line-of-sight (LOS) environment, in which little or no multipath propagation occurs. In a LOS environment, the received signal strength (RSS) at the transceiver may be almost entirely attributable to wireless propagation along a direct path between the tag and wideband transceiver. In other cases, the RF environment is a multipath environment with rich multipath propagation. In a multipath environment, there may be many RF reflectors and RF scatterers that reflect or scatter RF signals. In a multipath environment, RSS at the transceiver may be attributable, in large part, to wireless propagation along indirect paths between the tag and transceiver, including paths in which a signal is reflected or scattered by one or more nearby RF reflectors or RF scatterers.

The RF environment may have a large effect on the frequency response of the RFID tag, as measured by the wideband transceiver. For instance, the measured frequency response for a given content of the container may be very different in a LOS environment than in a multipath environment.

In illustrative implementations, a trained neural network accurately classifies the contents of a closed container, regardless of which RF environment the container, tag and wideband transceiver are located in. For instance, the trained neural network may accurately classify the contents of a closed container, even if the tag, container and wideband transceiver: (a) are located on a shelf in a crowded warehouse with many RF reflectors nearby; or (b) are located in an uncluttered room with no RF reflectors nearby.

To enable the neural network to accurately classify in a wide range of RF environments, it is desirable to train the neural network on a training data that encodes information about a large number of RF environments. In many cases, it would impracticable to actually measure the tag's frequency response is such a large number of RF environments.

Instead, a generative model may be employed to create synthetic data that realistically simulates a large number of RF environments. This synthetic data may be employed (after some further processing, discussed below) to help train the neural network to classify the contents of the container.

The generative model may comprise a variable autoencoder (VAE) or generative adversarial networks (GAN).

In many implementations of this invention, the data that is inputted into the generative model encodes information about multipath RF environments but does not encode information about the contents of the container. Based on this input, the generative model may output synthetic data that: (a) encodes information about many synthetic multipath RF environments; but (b) does not encode information about the contents of the container. The synthetic data may be employed (after further processing) to help train the neural network to accurately classify the contents of the container, regardless of the RF environment in which measurements are taken.

Thus, in illustrative implementations, it is desirable to extract—from measurements taken by the wideband transceiver-information about multipath RF environments. This may be done by calculating what we call "channel ratios".

Channel ratios may be calculated based on measurements taken while the container, tag and wideband transceiver are located in line-of-sight environments and while they are located in multipath environments. These measurements may be performed as follows: The wideband transceiver may repeatedly take measurements (LOS measurements) of the tag's frequency response while the container, tag and RFID tag are in a line-of-sight (LOS) environment. After each repetition, the container and tag may be moved slightly (e.g., less than a centimeter). Also, the wideband transceiver may repeatedly take measurements (multipath measurements) of the tag's frequency response while the container, tag and RFID tag are in a multipath environment. After each repetition, the multipath environment may be randomly changed. For instance, the multipath environment may be changed by randomly moving, after each iteration, one or more RF reflectors or RF scatterers that are not part of the sensor system and that are located in a region near the tag and transceiver (e.g., a cubic meter). Or, for instance, the multipath environment may be changed by moving into a different room of a building.

The LOS measurements and the multipath measurements (that are employed to calculate channel ratios) may be taken while the container is empty. Alternatively, the LOS measurements and multipath measurements (that are employed to calculate channel ratios) may be taken while the container contains different materials.

Consider the following example (Example 1). In Example 1, materials A, B, C and D are real alcohol, fake alcohol, real baby formula, and fake baby formula, respectively. In Example 1, we desire to train a neural network to perform two different classification tasks: the first task is to classify contents as either material A or material B (i.e., real alcohol or fake alcohol) and the second task is to classify contents as either material C or material D (real baby formula or fake baby formula). In Example 1, the wideband transceiver: (a) may take LOS measurements of the tag's frequency response when the container is filled with material A, when the container is filled with material B, when the container is filled with material C, and when the container is filled with material D; and (b) may take multipath measurements of the tag's frequency response when the container is filled with material A, when the container is filled with material B, when the container is filled with material C, and when the container is filled with material D.

A first set of channel estimates (LOS channel estimates) may be calculated from the LOS measurements, by standard channel estimation techniques. As used herein, $h_{k,LOS}$ denotes a channel estimate for a signal channel at frequency $f_k$ in a line-of-sight environment. Likewise, a second set of channel estimates (multipath channel estimates) may be calculated from the multipath measurements, by standard channel estimation techniques. As used herein, $h_{k,MPATH}$ denotes a channel estimate for a signal channel at frequency $f_k$ in a multipath environment.

In illustrative implementations of this invention, each channel ratio $P_k$ for a given frequency $f_k$ is calculated as a fraction, the numerator of which is a multipath channel estimate $h_{k,MPATH}$ for that frequency and the denominator of which is a LOS channel estimate $h_{k,LOS}$ for that frequency. We sometimes call a channel ratio a "multipath kernel". In other words $$P_k = \frac{h_{k,MPATH}}{h_{k,LOS}} \quad \text{(Equation 1)}$$

In illustrative implementations, the channel ratios are calculated in a combinatorial fashion. Each channel ratio $P_k$ may be calculated, in accordance with Equation 1, based on a unique combination of a specific $h_{k,MPATH}$ and a specific $h_{k,LOS}$.

In some implementations, each channel ratio is calculated in such a way that both its numerator and denominator are channel estimates derived from measurements of the same material. For instance, in some channel ratios: (a) the numerator may be a multipath channel estimate derived from measurements for material A; and (b) the denominator may be a LOS channel estimate derived from measurements for material A. Likewise, in other channel ratios: (a) the numerator may be a multipath channel estimate derived from measurements for material B; and (b) the denominator may be a LOS channel estimate derived from measurements for material B.

Advantageously, if the numerator and denominator of a channel ratio are both channel estimates derived from measurements of the same material, then: (a) the impact of the material (i.e., the contents of the container) may cancel out in the channel ratio; (b) the channel ratio may be independent of the material (contents of the container); and (c) the channel ratio may contain information about a multipath environment. Thus, if the numerator and denominator of a channel ratio are channel estimates derived from measurements of the same material (contents of a container), then the channel ratio may effectively extract information about a multipath environment from the channel estimates. The channel ratios that are independent of the material (contents of the container) may be fed as input into a generative model (e.g., VAE or GAN). The generative model may in turn generate (i.e., output) a large dataset of synthetic channel ratios. The synthetic channel ratios (which are outputted by the generative model) may contain information about a large number of multipath environments but may be independent of material (i.e., independent of the content of the containers). The synthetic channel ratios may be transformed (by a process we call embedding) into a large dataset of synthetic channel estimates, which contain information about both an environment and the material (contents of a container). The large dataset of synthetic channel estimates may be employed to help train a neural network to perform a classification task, as described below.

To illustrate a combinatorial approach (by which channel ratios may be calculated), we continue Example 1. Recall that, in Example 1, materials A, B, C and D are pure alcohol, fake alcohol, pure baby formula, and fake baby formula, respectively. Recall also that, in Example 1, we desire to train a neural network to perform two different classification tasks: the first task is to classify contents as either material A or material B (pure alcohol or fake alcohol) and the second task is to classify contents as either material C or material D (pure baby formula or fake baby formula).

In Example 1, the total number of channel ratios $P_k$ for a given frequency $f_k$ may be equal to (# of pure alcohol LOS channel samples×# of pure alcohol multipath channel samples)+(# of fake alcohol LOS channel samples×# of fake alcohol multipath channel samples)+(# of pure baby formula LOS channel samples×# of pure baby formula multipath channel samples)+(# of fake baby formula LOS channel samples×# of fake baby formula multipath channel samples), where each LOS sample for a given material is taken at a different position of the tag relative to the wideband transceiver and each multipath sample for a given material is taken in a different multipath environment.

In Example 1, the frequency response of the tag is measured over 26 different frequencies $f_k$. Let us assume that, in Example 1, 60,000 channel ratios $P_k$ are calculated for a given frequency $f_k$. Then, in Example 1, the total number of channel ratios $P_k$ that are calculated may be equal to 26×60,000=1,560,000.

Example 1 is a non-limiting example of this invention; this invention may be implemented in many other ways. For instance, the number of classification tasks, the number of samples per material, the sensing frequency band, the number of frequencies, and the number of channel ratios may vary. For example, in some implementations, there may be eight classification tasks and only 1,000 channel ratios for a given frequency $f_k$, and thus the number of samples per material may be less than in Example 1. Likewise, the combinatorial approach may be different than in Example 1. For example, in some cases, at least some of the measurements (to calculate channel ratios) are taken when the container is empty.

In illustrative implementations, each of the channel estimates ($h_{k,LOS}$ and $h_{k,MPATH}$) and each of the channel ratios $P_k$ is a complex number with a magnitude and angle.

As noted above, the channel ratios $P_k$ may be fed as input into a generative model, such as a VAE or GAN. The channel ratios $P_k$ that are fed into the generative model may be unlabeled.

In some implementations, the channel ratios $P_k$ that are inputted into the generative model contain information about multipath RF environments but that do not contain information about the contents of the container. Based on this input, the generative model may output synthetic data that: (a) contains information about many synthetic multipath RF environments; but (b) does not contain information about the contents of the container.

In some cases, the synthetic data outputted by the generative model (e.g., VAE or GAN) comprises a set of complex numbers $P_{k,OUT}$. In some cases, each $P_{k,OUT}$ is a synthetic channel ratio, is associated with a particular frequency $f_k$, and corresponds to a different synthetic multipath RF environment. In some cases, each $P_{k,OUT}$ is independent of—and contains no information regarding—the material contents of the container.

In some cases, the data $P_{k,OUT}$ outputted by the generative model is not well-suited for training a neural network to classify content of a container. In some cases, this is because the output of the generative model contains information about multipath RF environments, but does not contain information about the contents of the container.

In some cases, the outputs $P_{k,OUT}$ of the generative model are transformed into synthetic channel estimates $h_{k,SYN}$ by embedding information about the contents of the container. These synthetic channel estimates $h_{k,SYN}$ may then be employed to help train a neural network to perform a classification task (such as to classify an unknown material as either material A or material B).

Measurements may be taken, for use in the embedding. Different subsets of the measurements may be gathered for different materials (e.g., pure alcohol or fake alcohol). For instance, the wideband transceiver may take repeated measurements (material A LOS measurements) of the tag's frequency response, while the container is in a LOS environment and contains material A. After each iteration, the container and tag to which it is attached may be moved slightly (e.g., less than one centimeter). The wideband transceiver may also take repeated measurements (material B LOS measurements) of the tag's frequency response, while the container is in a LOS environment and contains material B. Again, after each iteration, the container and tag to which it is attached may be moved slightly (e.g., less than one centimeter), resulting in a new multipath environment.

LOS channel estimates may then be calculated, for use in the embedding. A first set of channel estimates (material A LOS channel estimates) may be calculated from the material A LOS measurements, by standard channel estimation techniques. As used herein, $h_{k,LOS,MAT\ A}$ denotes a channel estimate for frequency $f_k$ in a line-of-sight environment where the contents are material A. A second set of channel estimates (material B LOS channel estimates) may be calculated from the material B LOS measurements, by standard channel estimation techniques. As used herein, $h_{k,LOS,MAT\ B}$ denotes a channel estimate for frequency $f_k$ in a line-of-sight environment where the contents are material B.

Synthetic channel estimates may then be calculated. Each synthetic channel estimate $h_{k,SYN}$ for a given frequency $f_k$ may be calculated as a product of (a) a $P_{k,OUT}$ (i.e., an output of the generative model) and (b) an LOS channel estimate that is either a $h_{k,LOS,MAT\ A}$ or a $h_{k,LOS,MAT\ B}$. We sometimes loosely refer to this multiplication as "embedding" data about the contents of the container.

In illustrative implementations, the synthetic channel estimates $h_{k,SYN}$ are calculated in a combinatorial fashion. Each synthetic channel estimate may be calculated, in accordance with the preceding paragraph, using on a unique combination of a specific $P_{k,OUT}$ and a specific LOS channel estimate.

Synthetic channel estimates may be calculated for each of the materials in the classification task that the neural network is being trained for. For instance, if one desires to train a neural network to classify materials A and B, then: (a) each synthetic channel estimate $h_{k,SYN,MAT\ A}$ that is associated with material A may be calculated by multiplying a $P_{k,OUT}$ and a $h_{k,LOS,MAT\ A}$; and (b) each synthetic channel estimate $h_{k,SYN,MAT\ B}$ associated with material B may be calculated by multiplying a $P_{k,OUT}$ and a $h_{k,LOS,MAT\ B}$.

To illustrate this combinatorial approach (in embedding), consider the following example (Example 2). In Example 2, we desire to train a neural network to classify an unknown material as either material A or material B. In Example 2, materials A and B are pure alcohol and fake alcohol, respectively.

In Example 2, the total number of synthetic channel estimates $h_{k,SYN}$ for a given frequency $f_k$ may be equal to (# of LOS samples for pure alcohol×# of outputs of generative model)+(# of LOS samples for fake alcohol×# of outputs of generative model), where each LOS sample for a given material is taken at a different position of the tag relative to the wideband transceiver.

Let us assume that, in Example 2: (a) 1,000 outputs of the generative model are employed for the embedding; and (2) a total of sixteen LOS samples are taken for the embedding, including eight for pure alcohol and eight for fake alcohol. In Example 2, 16,000 synthetic channel estimates may be calculated ((8×1,000)+(8×1,000)) for each frequency $f_k$.

In Example 2, the frequency response of the tag is measured over 26 different frequencies $f_k$. Thus, in Example 2, the total number of synthetic channel estimates $h_{k,SYN}$ may be equal to 26×16,000=416,000.

Example 2 is a non-limiting example of this invention; this invention may be implemented in many other ways. For instance, the number of classification tasks, samples, frequencies and synthetic channel estimates may vary. Likewise, the combinatorial approach may be different.

In some implementations, labeled "real" data and labeled synthetic data may be fed as input into a neural network, in order to train the neural network to classify materials (e.g., to recognize whether a container contains a first material or a second material).

Consider the following example (Example 3). In Example 3, the training dataset (for training a classifier) includes four types of data: (a) a first set of "real" data; (b) a second set of "real" data; (c) a first set of synthetic channel estimates; and (d) a second set of synthetic channel estimates. The first set of "real" data may comprise channel estimates that are calculated (by standard channel estimation techniques) based on measurements of the tag's frequency response that were taken while the container contains material A. This first set of "real" data may be labeled in such a way as to be associated with material A. The second set of "real" data may comprise channel estimates that are calculated (by standard channel estimation techniques) based on measurements of the tag's frequency response while the container contains material B. This second set of "real" data may be labeled in such a way as to be associated with material B. The first set of synthetic channel estimates $h_{k,SYN,MAT\_A}$ may simulate the channel estimates that would result from measuring the tag's frequency response in a large number of synthetic RF environments while the container contains material A. This first set of synthetic channel estimates may be labeled in such a way as to be associated with material A. The second set of synthetic channel estimates $h_{k,SYN\_B}$ may simulate the channel estimates that would result from measuring the tag's frequency response in a large number of synthetic RF environments while the container contains material B. This second set of synthetic channel estimates may be labeled in such a way as to be associated with material B.

In Example 3, the labeled first and second sets of "real" data and the labeled first and second sets of synthetic channel estimates may be fed into a neural network, to train the neural network to distinguish between a container that contains material A and a container that contains material B.

After the neural network is trained, the system may perform testing, in which the system classifies unknown contents of a container. Specifically, the wideband transceiver may take new measurements of a frequency response of an RFID tag (where the tag is attached to the container). The container may contain unknown contents. New channel estimates may be estimated (by standard channel estimation techniques), based on the new measurements. These new channel estimates may be fed as inputs into the trained neural network. Based on the new channel estimates, the trained neural network may classify the unknown contents—e.g., may determine that the contents are material A or may determine that the contents are material B.

In some cases, after a first neural network is trained to perform a first classification task, a second neural network is trained to perform a second classification task. For instance, the first classification task may be to distinguish between real medicine and fake medicine; and the second classification task may be to distinguish between two vintages of wine.

When training the second neural network, transfer learning may be employed. Specifically, the weights for some but not all layers of the second neural network (a) may be set be equal to weights of corresponding layers of the trained first neural layer and (b) after being set, may remain constant during training of the second neural network.

In the transfer learning, the first and second neural networks may each comprise a feature encoder and classifier. We sometimes call the layers of the second neural network—in which weights are fixed as equal to the weights of corresponding layers of the first neural network—the "common layers" of the second neural network. The common layers may consist of some or all of the layers of the feature encoder of the second neural network. The remaining layers ("task-specific layers") of the second neural network may comprise the classifier (and, in some cases, a subset of the layers of the feature encoder). Weights for the task-specific layers may be adjusted (in a conventional manner, e.g., by backpropagation) while the second neural network is being trained to perform the second classification task. However, weights of common layers of the second neural network may be set equal to weights of corresponding layers of the first neural layer and after being set, may remain constant during the training of the second neural network.

Put differently, when a second neural network is being trained to classify a new set of materials, the common layers of the encoder may be "frozen" and re-used "as is". In other words, when a second neural network is being trained to classify a new set of materials, the weights of the common layers of the first neural network may be transferred to the second neural network and re-used without further adjustment during training of the second neural network.

In some cases, the transfer learning includes the following steps: (1) Train a first neural network on a source domain (e.g., train it to perform a first classification task). The first neural network may comprise a feature encoder and a source classifier for the source domain. (2) Create a second neural network, which consists of a feature encoder and classifier. Fix the weights of all or some of the layers ("common layers") of the feature encoder of the second neural network, by setting them equal to the weights of same layers in the first neural network. (3) Train the second neural network on a target domain (i.e., train it to perform a second classification task). During the training of the second neural network: (a) weights are updated for all of the layers of the second neural network, except that the fixed weights of the common layers (which were transferred from the first neural network) remain constant during the training of the second neural network. The steps described in this paragraph are a non-limiting example of transfer learning, in illustrative implementations of this invention. The transfer learning may be performed in many different ways.

In some use scenarios, samples of an authentic material may be easily obtained, but it may be difficult or impossible to obtain samples of the many different contaminated materials that could occur when the authentic material is adulterated, spoiled, poisoned or replaced with a harmful or fake material. In those use scenarios, a trained generative model may be employed to detect an anomaly in contents of a closed container, even the first time that the anomaly is encountered.

The anomaly detection may exploit the fact that a generative model (e.g., VAE or GAN) that has been trained of a first type of channel ratios may have a high reconstruction loss if a second type of channel ratios is fed as input into the generative model. Consider the following example (Example 4). In Example 4, there are two types of channel ratios. In Example 4, in the first type of channel ratio: (a) the numerator and denominator of the channel ratio are channel estimates derived from measurements of the same material (contents of a container); (b) the impact of the material cancels out in the channel ratio; (c) the channel ratio is independent of the material; and (d) the channel ratio contains information about the RF environment but does not contain information about the material (contents of a container). In Example 4, in the second type of channel ratio: (a) the numerator of the channel ratio is a channel estimate derived from measurement of a first material; (b) the denominator of the channel ratio is a channel estimate derived from measurement of a second, different material; (c) the impact of the first and second materials do not cancel out in the channel ratio; (d) the channel ratio is not independent of the first and second materials; and (e) the channel ratio contains information about a multipath environment, the first material and the second material. Thus, in Example 4, the first and second types of channel ratios are quite different from each other. In Example 4, a generative model (e.g., VAE or GAN) trains on the first type of channel ratios. In Example 4, if new channel ratios are subsequently fed as input into the trained generative model (which trained on the first type of channel ratios) and the new channel ratios are the first type of channel ratios, then the output of the generative model may have a low reconstruction loss. But, in Example 4, if new channel ratios are fed as input into the trained generative model (which trained on the first type of channel ratios) and the new channel ratios are the second type of channel ratios, then the output of the generative model may have a high reconstruction loss.

The anomaly detection may be performed as follows:

First, a VAE may be trained as described above, with channel ratios that contain information about environments but do not contain information about the contents of the container.

Second, measurements may be taken with authentic contents (e.g., medicine) in LOS environments. For instance, a wideband transceiver may repeatedly take measurements of frequency responses of an RFID tag that is in a LOS environment and that is attached to a container that holds contents that are authentic (e.g., medicine). After each repetition, the tag and container may be moved a short distance (e.g., less than a centimeter) relative to the wideband transceiver. Based on these measurements of authentic contents in LOS environments, a set of LOS channel estimates $h_{k,LOS,AUTHENTIC}$ may be calculated.

Third, measurements may be taken with unknown contents in multipath environments. For instance, a wideband transceiver may take repeated measurements of frequency responses of an RFID tag that is in a multipath environment and that is attached to a container that holds unknown contents. After each repetition, the multipath environment may be randomly changed. For instance, the multipath environment may be changed by randomly moving, after each iteration, one or more RF reflectors or RF scatterers that are not part of the sensor system and that are located in a region (e.g., a cubic meter) that is near the tag and transceiver. Or, for instance, the multipath environment may be changed by moving into a different room of a building. Based on these measurements with the unknown contents in multipath environments, a set of multipath channel estimates $h_{k,MPATH,TEST}$ may be calculated.

Fourth, channel ratios may be computed in a combinatorial manner, where each of the channel estimates is a fraction, the numerator of which is a $h_{k,MPATH,TEST}$ and the denominator of which is a $h_{k,LOS,AUTHENTIC}$. We sometimes refer to each of these channel ratios (which are calculated for anomaly detection) as a "test channel ratio" or $P_{k,TEST}$. Thus $$P_{k,TEST} = \frac{h_{k,MPATH,TEST}}{h_{k,LOS,AUTHENTIC}}$$

Fifth, the test channel ratios may be fed into the trained VAE, and the reconstruction loss of the VAE may be evaluated. If the unknown content is authentic, then in some cases: (a) the test channel ratios $P_{k,TEST}$ will not contain information about the contents of the container; and (b) when the test channel ratios are fed as input to the trained VAE, the trained VAE will output synthetic data with a low reconstruction loss. If the unknown content is contaminated, then in some cases: (a) the test channel ratios $P_{k,TEST}$ will contain information about the contents of the container; and (b) when the test channel ratios are fed as input to the trained VAE, the trained VAE will output synthetic data with a high reconstruction loss.

In some cases, there are two possible results of the anomaly detection: authentic or anomalous. That is, if the reconstruction loss is less than a threshold amount, then determine that the unknown content is authentic (matches the authentic content). If the reconstruction loss is greater than or equal to a threshold amount, then determine the content is contaminated (i.e., that there is an anomaly).

In some cases, there are three possible results of the anomaly detection: authentic, anomalous or inconclusive. That is, if the reconstruction loss is less than or equal to a first threshold amount, then determine that the unknown content is authentic (matches the authentic content). If the reconstruction loss is greater than a second, higher threshold amount, then determine the content is contaminated (i.e., that there is an anomaly). If the reconstruction loss is greater than the first threshold amount and less than the second threshold amount, then determine that the test result is inconclusive.

The preceding eight paragraphs are non-limiting examples of how anomaly detection may be performed in this invention (including how reconstruction losses may be evaluated and what the trained VAE would output during anomaly detection). For instance, in some cases, a GAN (instead of a VAE) is used for anomaly detection.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIG. 8 shows an algorithm for anomaly detection.

FIG. 9 is a flowchart for a method of classifying the content of a container.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

Weak Coupling

When an RFID tag is placed in the vicinity of a material, the electromagnetic field of the RFID's antenna is affected by the material. This phenomenon—which is sometimes called "weak coupling" or "near-field coupling"—may occur primarily within a one-wavelength distance from the antenna.

Weak coupling may occur even when the RFID tag's antenna is not in direct contact with the material. For instance, weak coupling may occur between (a) an RFID tag that is attached to an external surface of container and (b) the contents (e.g., milk) of the container.

Figure 1:
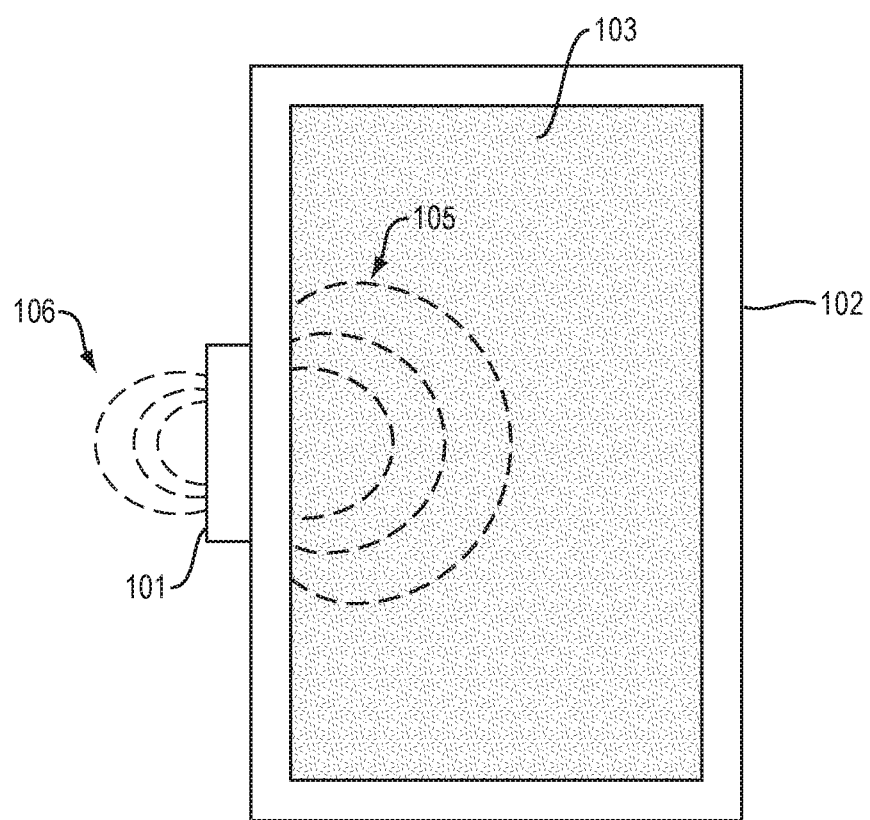
FIG. 1 shows weak coupling with the content of a closed container.

FIG. 1 illustrates weak coupling, in an illustrative implementation of this invention. In FIG. 1, an RFID tag 101 is attached to an external surface of container 102 that contains contents 103 (e.g., liquid or solid). Weak coupling occurs, causing electromagnetic field lines 105 that run through the contents 103 to have a different shape than do the electromagnetic field lines 106 that run through air. (FIG. 1 is a cross-sectional view which shows a cross-section of container 102 and contents 103.)

The weak coupling may affect the frequency, amplitude and phase of the radio signal that reflects from the RFID tag. For instance, if an RFID tag is attached to an outer surface of a container that contains liquid, then weak coupling with the liquid may shift the center frequency of, and change the measured amplitude of, a radio signal that reflects from the RFID tag. (However, in illustrative implementations, weak coupling does not alter binary data that is encoded in the reflections from the RFID tag, such as the binary data of an EPC-Gen2 response).

The magnitude and distribution of the weak coupling with a material are determined by an intrinsic property of the material called relative permittivity. (Relative permittivity is sometimes denoted by $\varepsilon$ and is sometimes called dielectric constant). A material's relative permittivity is a function of electrochemical and electrophysical properties of that material (e.g., molecules and ions in the material). Hence, if these material properties of the contents of a container change (e.g., if bacteria grows in milk or if sugar is added to a beverage), then the contents' relative permittivity changes. A change in relative permittivity of the contents may in turn cause the electromagnetic distribution of the weak coupling to change, which may in turn alter the structure (e.g., amplitude and phase as a function of frequency) of a radio signal that reflects from the RFID tag.

In illustrative implementations of this invention, a system leverages this phenomenon to classify material inside a container—or to detect an anomaly in the material. The system may sense minute variations in an RFID tag's response that result from small changes in the relative permittivity of a material that is inside a container to which the RFID tag is attached. For instance, when an RFID tag transmits its identifier, the weak coupling may affect the signal structure of its transmission. The received signal from the tag (that is measured by a wideband transceiver) may be represented as a complex number that has both a magnitude A and a phase $\theta$. The magnitude and phase are functions of both the frequency $f_k$ and the material's relative permittivity $\varepsilon$.

In illustrative implementations, a trained neural network recognizes the contents of the container, by recognizing a signal structure that characteristically occurs when a particular material (e.g., grain alcohol) is inside the container. Likewise, a trained neural network may detect an anomaly in the contents of the container (e.g., adulterated baby formula), by determining that the signal structure of the measured RF response differs by more than a threshold amount from the signal structure which characteristically occurs when an authentic version of the contents (e.g., normal baby formula) is inside the container.

Wideband RFID Sensing

In illustrative implementations of this invention, at least two transceivers are employed to transmit radio signals to the RFID tag and to receive reflected radio signals from the RFID tag: (a) an RFID reader that we sometimes call a "power & communication reader" or "P&C reader"; and (b) a wideband transceiver. The P&C reader may provide power to, and communicate with, the RFID tag. The wideband transceiver may sense the frequency response of the tag over a wide range of frequencies.

In illustrative implementations of this invention, the P&C reader transmits a first RF signal in a relatively narrow frequency band, such as the ISM (industrial, scientific and medical) band of 902 MHz-928 MHz which has a bandwidth of only 26 MHz. The P&C reader may provide power to, and communicate with the RFID tag. In many cases, the RFID tag has no batteries and harvests wireless power from the RF signal that is transmitted by the P&C reader.

For instance, the P&C reader may transmit a first RF signal that travels to an RFID tag (which is attached to the outside of a container), then reflects from the tag, and then travels back to the reader. The RFID tag may harvest energy from the P&C reader's signal, in order to power up and respond (e.g., with a 96-bit identifier that uniquely identifies the tag). The RF signal transmitted by the P&C reader (e.g., query) and the modulated RF reflections from the RFID tag (e.g., answer) may be in accordance with an industry standard, such as the EPC-Gen2 protocol. The RFID tag may communicate by modulating reflection of radio signals from the RFID tag. The RFID tag may employ an ultra-low power communication scheme called backscatter.

In illustrative implementations, the wideband transceiver transmits a second RF signal in a much wider frequency band (e.g., a band that has a bandwidth of 500 MHz). The wideband transceiver may be employed to sense the structure (e.g., amplitude and phase) of the reflected second signal that reflects from the RFID tag and that travels back to the wideband transceiver.

In many implementations, the wideband transceiver transmits in a completely different frequency band that that in which the P&C reader transmits. For instance: (a) the wideband transceiver may transmit in a wide band from 500 MHz to 1 GHz; and (b) the P&C reader may transmit in the relatively narrow 902 MHz-928 MHz ISM band that is conventionally used for UHF (ultra-high frequency) RFID communications in the United States.

In some implementations, the wideband transceiver (which transmits in a wide band outside the ISM band) transmits at a much lower power than does the P&C transceiver (which transmits in the 902 MHz-928 MHz ISM band). This may enable the system to remain compliant with FCC regulations for consumer electronics, which permit only very low-power RFID communication outside the ISM band.

The wideband transceiver may measure a frequency response of the RFID tag over a wide band of frequencies (e.g., over a bandwidth that is greater than n 10 MHz, or greater than 50 MHz, or greater than 100 MHz, or greater than 200 MHz, or greater than 300 MHz, or greater than 400 MHz, or greater than 500 MHz). RF channel estimates may be extracted from the measurements. A system (which includes a trained neural network) may analyze the channel estimates, to identify the contents of the container to which the RFID tag is attached.

In many implementations, it is highly desirable for the wideband transceiver to employ a wide band of RF frequencies for sensing the signal structure of the reflected RF signal from the RFID tag. This is because the system's accuracy (in classifying or detecting an anomaly in contents of a container to which the RFID is attached) may increase as the bandwidth employed for sensing increases. In tests of a prototype of this invention, the inventors observed that the prototype's accuracy of classification increases as the bandwidth transmitted by the wideband transceiver increases.

In some cases, the wideband transceiver performs frequency hopping, by transmitting a narrow-band signal at different center frequencies at different times. For instance, the wideband may transmit a narrowband signal at different center frequencies, one center frequency at a time, in a temporal sequence. For example, in some cases, the wideband transceiver transmits, in a temporal sequence, 26 different center frequencies that are spaced at 20 MHz intervals over a 500 MHz bandwidth.

In other cases, the wideband transceiver transmits an OFDM (orthogonal frequency-division multiplexing) signal that includes multiple subcarriers. In yet other cases, the wideband transceiver transmits a spread spectrum signal, such as an CDMA (code-division multiple access) signal, SSMA (spread spectrum multiple access) signal or a DSSS (direct-sequence spread spectrum) signal.

Figure 2:
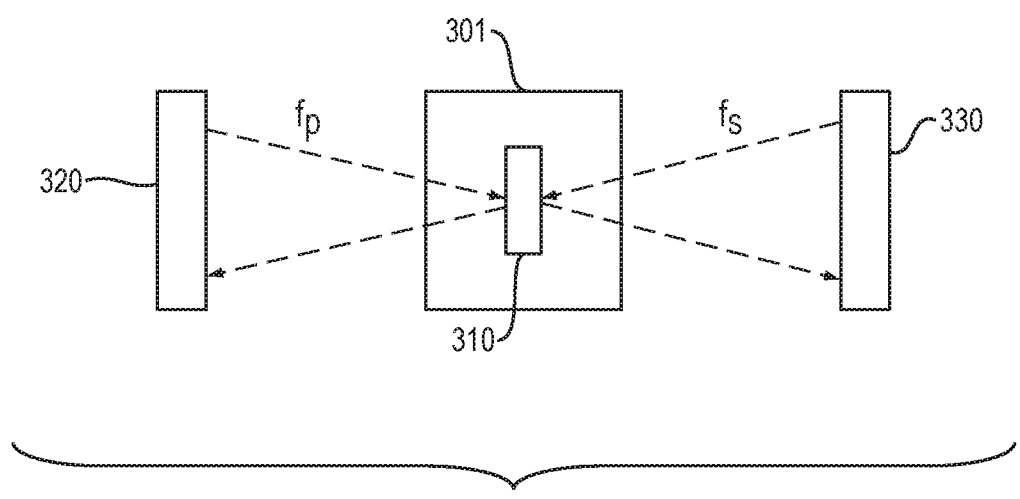
FIG. 2 illustrates wideband RFID sensing.

FIG. 2 illustrates wideband RFID sensing, in an illustrative implementation of this invention. In the example shown in FIG. 2, an RFID tag 310 is attached to the outside of container 301. An RFID reader 320 transmits a first signal $f_p$ at a frequency that is in the 902 MHz-928 MHz ISM band. The first signal $f_p$ provides wireless power to tag 310 and is employed for communicating with tag 310.

In FIG. 2, a wideband transceiver 330 transmits a wideband signal $f_s$ that is employed for measuring the tag's response over a wide band of frequencies (e.g., over a bandwidth of 500 MHz). The wideband signal may be frequency hopped, or may comprise OFDM symbols, or may comprise a spread spectrum signal (e.g., a CDMA, SSMA, or DSSS signal).

Channel Estimates

In some implementations, channel estimates are derived from measurements taken by the wideband transceiver. These estimates may consist of channel estimates $h_k$ at each frequency $f_k$ in a set of frequencies. For instance, in some cases, the set of frequencies consists of 26 frequencies, spaced at 20 MHz intervals, over a 500 MHz bandwidth.

The channel estimates $h_k$ may be obtained using standard channel estimation. For instance, a known preamble $p_t$ of the tag's response $y_t$ may be employed to obtain an estimate of the channel $h_k$ at a given sensing frequency $f_k$ as follows:

$$h_k = \sum_t y_t p_t^*$$

By repeating this operation over different sensing frequencies, the wideband transceiver may obtain channel estimates $\{h_1 \ldots h_K\}$ over a wide bandwidth. Each channel estimate $h_k$ may be a complex number that has a magnitude and angle. Each channel estimate $h_k$ may represent the amplitude and phase of a portion (sometimes called a channel) of a wireless RF signal, which channel occurs in a very narrow frequency band that includes frequency $f_k$.

Each wireless channel may be expressed as a complex number $$h_k = \sum_t a_i e^{-j2\pi f_k \tau_i}$$

where the summation is taken over all the propagation paths i (both line-of-sight and indirect paths), where $a_i$ and $\tau_i$ are the amplitude and time delay of the i-th path, and where $\pi$ is Archimedes' constant.

Hardware

Figure 3:
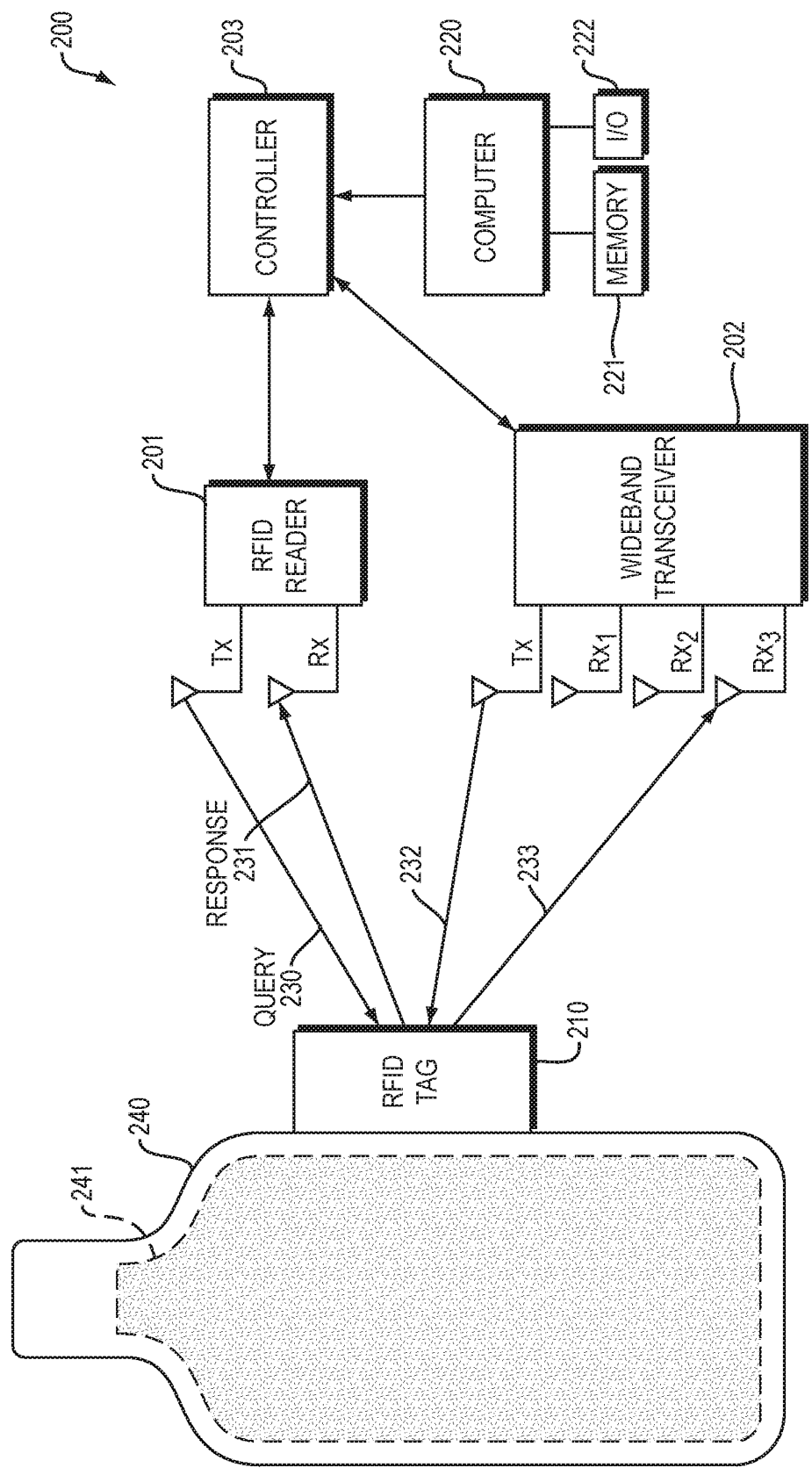
FIG. 3 shows a system that performs wideband RFID sensing of the contents of a container.

FIG. 3 shows a system 200 that performs wideband RFID sensing of the contents of a container, in an illustrative implementation of this invention. In FIG. 3, an RFID tag 210 is attached to an external surface of a container 240. The container 240 contains contents 241 (e.g., a liquid or solid). FIG. 3 shows a cross-sectional view of container 240 and contents 241.

In FIG. 3, a wideband transceiver 202 transmits at multiple different frequencies, and measures the tag's response at each of the frequencies. Weak coupling may occur between the tag's antenna and the contents 241. This weak coupling may affect the structure (e.g., amplitude and phase) of an RF signal that reflects from tag 210 at each of the frequencies. The weak coupling and the alteration of the reflected signal may be dependent on the relative permittivity of the contents of the container, which in turn may depend on the material composition of the contents. Each type of material (i.e., each type of contents of the container) may have a characteristic effect on the reflected signals measured by wideband transceiver. System 200 may: (a) take, as an input, the amplitude and phase of the received signal at each of the frequencies; and (b) output a classification of the contents 241 of container 240.

In FIG. 3, system 200 includes both: (a) a wideband transceiver 202; and (b) an RFID reader 201. Wideband transceiver 202 may perform sensing over a wide bandwidth. RFID reader 201 may be a P&C reader that provides wireless power to tag 210 and that communicates with tag 210.

The transmit (Tx) antenna of RFID reader 201 may transmit a query 230 to a RFID tag 210. Tag 210 may reflect a modulated response 231 to a receiver (Rx) antenna of RFID reader 201.

Wideband transceiver 202 may transmit, via one or more transmit antennas, a signal 232 to RFID tag 210. In some cases, wideband transceiver 202 frequency hops, in such a way that it transmits a narrow-band signal at different frequencies at different times. In other cases, wideband transceiver 202 transmits OFDM symbols. In yet other cases, wideband transceiver 202 transmits a spread spectrum signal, such as a CDMA, SSMA, or DSSS signal.

In some cases, signal 232 (which is transmitted by wideband transceiver 202) comprises OFDM symbols. Each OFDM symbol may include multiple orthogonal subcarriers in different frequency bins, where the highest frequency of the highest frequency subcarrier is much greater than the lowest frequency of the lowest frequency subcarrier. For instance, the difference between these highest and lowest frequencies may be greater than or equal to 10 MHz, or greater than or equal to 50 MHz, or greater than or equal to 100 MHz, or greater than or equal to 200 MHz.

In FIG. 3, a controller computer 203 controls and interfaces with the RFID reader 201 and wideband transceiver 202. For instance, controller 203 may comprise a microcontroller or microprocessor.

Optionally, an additional computer 220 may control and interface with controller 203. Computer 220 may store data in, and access data stored in, a memory device (e.g., 221). Likewise, controller 203 may store data in, and access data stored in, a memory device. A human user may input data or instructions to computer 220—and may receive outputted data from computer 220—via one or more I/O (input/output) devices 222. For instance, the one or more I/O devices 222 may comprise any combination of one or more display screens, touch screens, keyboards, computer mice, microphones, speakers, earbuds, earphones, projectors, and haptic transducers.

In some cases, controller 203 or computer 220 controls transmission of RF signals by reader 201 and by wideband transceiver 202 in such a way that the contents 241 of container 240 are classified based on measurements that are taken by wideband transceiver 202 while RFID tag 210 is in a first reflective state or is in a second reflective state and that are not taken while RFID tag 210 is transitioning between the first and second reflective states. In some cases, RFID tag 210 may be more reflective of RF radiation during the first reflective state than during the second reflective state, or may reflect RF radiation at a different phase during the first reflective state than during the second reflective state.

In some cases, changes in the reflective state of RFID tag 210 are caused by changes in impedance of the RFID tag 210. The RFID tag may switch rapidly between: (a) a more reflective state and (b) a less reflective state. In the more reflective state, a switch in the RFID tag may be closed, causing: (a) the tag's antenna to be connected to ground; (b) impedance in a circuit that includes the tag's antenna to be zero (or close to zero); and (c) more RF power to be reflected by the tag's antenna. In the less reflective state, the switch in the RFID tag may be open, causing: (a) RF power to flow into the tag's power harvesting unit; (b) impedance in a circuit that includes the tag's antenna to be high; and (c) less RF power to be reflected by the tag's antenna. The switch in the RFID tag that is employed for this modulation (of impedance and reflectivity) may comprise a transistor.

In some cases, the reflective state of a backscatter node (e.g., RFID tag) may vary over time, in such a way that the backscatter node is, at any given time, in either a first reflective state or a second reflective state or is transitioning between the first and second states. The first reflective state may differ from the second reflective state in that a reflection response of the backscatter node is different in the first reflective state than in the second reflective state. The reflection response may be phase or amplitude of RF reflection from the backscatter node as a function of RF radiation incident on the backscatter node In some cases, the impedance (and thus reflective state) of RFID tag 210 is modulated by RFID tag 210 in response to an RFID signal transmitted by RFID reader 201. While the reflective state of RFID tag 210 is being modulated (in response to an RFID signal transmitted by RFID reader 201): (a) one or more transmit antennas of wideband transceiver 202 may transmit signal 232; and (b) a modulated signal (e.g., 233) may reflect from RFID tag 210 and travel to one or more receive antennas of the wideband transceiver 202. In some cases: (a) the RFID query 230 and RFID response 231 are in a narrow ISM frequency band (e.g., an ISM band between 902 MHz and 928 MHz); and (b) the wideband transceiver transmits signal 232 in a much wider frequency band (e.g., that has a bandwidth of at least 50 MHz or at least 100 MHz or at least 200 MHz.) In some cases, both transmitted signal 232 and reflected signal 233 comprises OFDM symbols.

In some cases, each specific receiver antenna of the wideband transceiver 202 receives a modulated signal (e.g., 233) that reflects from RFID tag 210.

The wideband transceiver may have one or more antennas. For instance, the wideband transceiver may have: (a) a transmit (Tx) antenna and a single receiver (Rx) antenna; or (b) a transmit (Tx) antenna and multiple receiver (Rx) antennas; or (c) only one antenna.

This invention is not limited to sensing the contents of a single container. The system may measure RF reflections from multiple RFID tags, each of which is attached to an exterior surface of a different container that contains unknown contents. Based on these measurements, the system may classify the contents of—or detect an anomaly in—the contents of multiple containers. The system may employ EPC-Gen2 protocol for RFID communication, and thus may easily distinguish between the signals from the different RFID tags.

The RFID tags may either be already affixed on the container by the manufacturer. Alternatively, the RFID tags may be attached as stickers to the container. In many implementations: (a) the RFID tag is not in direct physical contact with the contents of the container; and (b) a wall of the container is between the tag and the contents of the container.

This invention is not limited to battery-free RFID tags that are wirelessly powered by an RFID reader. For instance, the RFID tags may be battery-assisted or solar-powered.

Orthogonal Frequency-Division Multiplexing

In some implementations, the wideband transmitter transmits a wideband signal that comprises OFDM symbols. These OFDM symbols may be employed for robust channel estimation.

As used herein, "channel estimator" or "CE" means, collectively, a wideband transceiver (e.g., 330 or 202) and one or more computers (e.g., 203 and 220) that control the wideband transceiver and that perform channel estimation based on measurements taken by the wideband transceiver.

Figure 4:
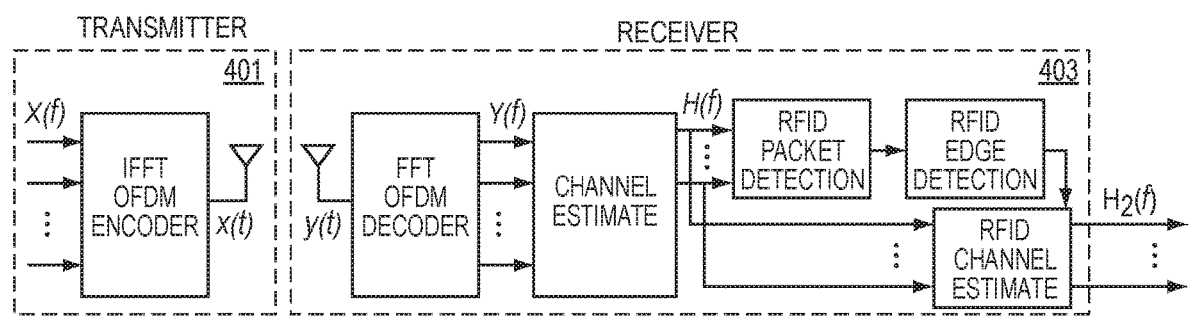
FIG. 4 illustrates channel estimation with OFDM.

FIG. 4 illustrates channel estimation with orthogonal frequency-division multiplexing (OFDM). In the example shown in FIG. 4, a transmitter 401 in the wideband transceiver transmits OFDM symbols. A receiver 403 in the wideband transceiver demodulates these symbols by performing an FFT (fast fourier transform) followed by an overall channel estimation step. In FIG. 4, the overall channel is fed into an RFID packet and edge detection module, in order to discover the RFID's state transitions. Based on the output of the edge detection and elimination block, reliable wideband channel estimates may be extracted.

In some implementations of this invention, a channel estimator (CE) obtains channel estimates by measuring a single frequency response of an RFID tag. The CE may employ the wideband estimates for accurate classification of the contents of a container to which the RFID tag is attached.

An RFID tag may communicate with the P&C reader by modulating the signal that reflects from the tag. To do so, the tag may switch between two states: reflective and non-reflective, to transmit bits of zeroes and ones.

Backscatter modulation by the RFID tag. may be frequency agnostic: e.g., an RFID tag may modulate not only the reader's signal but also all transmitted signals in the environment. This, in turn, may enable the CE to estimate a tag's channel out-of-band. In particular, as an RFID backscatters the P&C reader's signal, the wideband transceiver) may transmit an unmodulated wave at another frequency for sensing and the tag's channel at that sensing frequency may be estimated.

In some implementations of this invention, a CE performs an OFDM (orthogonal frequency division multiplexing) modulation technique. The OFDM modulation may simplify channel estimation over a wide bandwidth.

In some implementations of this invention that employ OFDM, a wideband channel may be divided into a set of multiple narrowband channels, and OFDM modulation may be performed in the frequency domain. As shown in FIG. 4: (a) the OFDM modulator may encode information in the frequency domain as X(f) and then take an IFFT (inverse fast fourier transform) before transmitting the signal over the air; (b) the receiver may demodulate the signal by taking a FFT (fast fourier transform), and may estimate the channel H(f) by dividing the FFT's output by X(f).

In some implementations, the OFDM symbols are transmitted in such a way that the symbols may be employed with backscatter modulation. Consider FIG. 5 which shows an example of both backscatter modulation and the OFDM symbols over time. For accurate OFDM channel estimation, it is desirable that the entire OFDM symbol lies within a channel coherence time (i.e., that the channel does not change during the estimation process). However, as a backscatter node switches its impedance, it causes an extremely fast-fading channel and corrupts the OFDM channel estimate. Hence, if we choose long OFDM symbols, then all of them will be corrupted with the backscatter switching process. On another hand, if we choose very short symbols, we cannot pack many frequencies into them, which would prevent us from estimating the wideband channel at sufficient frequency resolution to deal with frequency selectivity.

To address this challenge and obtain both non-corrupted and fine-grained wideband estimates, the CE may exploit information about the backscatter switching rate of the RFID tag. The CE may obtain this information from the P&C reader. Specifically, the P&C reader may communicate that rate (called backscatter link frequency or BLF) in its downlink command to the RFID tag. Hence, by coordinating with the P&C reader, the CE may use the BLF to construct its OFDM symbols.

To ensure that the channel is not corrupted, an OFDM symbol may be transmitted in such a way that it lies entirely within a specific RFID reflection mode (i.e., transition-free region). To achieve this, the OFDM symbol duration $T_{symbol}$ may be smaller than half the period of an RFID switching period $T_{switching}$:

$$T_{symbol} < \frac{T_{switching}}{2} = \frac{1}{2BLF}$$

Consider the following example, where: (a) an OFDM symbol consists of N samples (i.e., N subcarriers), each with time period $T_{sample}$, and (b) B denotes the overall bandwidth of the CE's OFDM transmission. In this example, to ensure that an OFDM symbol is sufficiently short so that it may occur entirely in a specific RFID reflection mode (i.e., a transition-free region), the CE may employ a number N of samples (OFDM subcarriers) such that $$N < \frac{B}{2BLF}.$$

For example, if the CE's OFDM bandwidth is 100 MHz and the backscatter link frequency is 500~KHz, the CE may employ OFDM where N is less than 100.

Now we discuss how the CE may obtain robust channel estimates on the receive side. A difficulty in wideband estimation arises from the low SNR (signal-to-noise ratio) at each subcarrier since the power is spread across frequencies. This may, unless compensated for, complicate packet detection and reduce the reliability of the sensed channel.

Robust Packet Detection: In some implementations, to compensate for the reduced power and robustly estimate the beginning of a backscatter packet, the CE exploits a frequency agnostic property of backscatter modulation. In particular, since the different OFDM subcarriers undergo the same backscatter modulation from the RFID tag, the CE may incoherently average their estimates. Such averaging may enable the CE to reliably observe changes in the overall reflected power and to use them to detect the beginning of the RFID response. Specifically, for every OFDM symbol at time n, the CE may compute $$H_{combimed}(n) = \sum_f |H(f, n)|.$$

Also, the CE may leverage knowledge of the RFID packet's preamble to detect the packet start. Specifically, every RFID packet payload may be preceded by a known preamble p(n). Hence, the CE may correlate the averaged channel estimates $H_{combined}(n)$ with the preamble to detect packet start. This correlation may be written as:

$$D(\Delta) = \sum_{n=1}^{T} p^*(n) H_{combined}(n + \Delta)$$

where T is the preamble length and $\Delta$ is the time instance where correlation is performed.

The CE may identify the packet beginning when D rises above a threshold.

Edge Flip Elimination: Next, the CE may eliminate corrupted OFDM symbols. Recall the CE may construct the OFDM symbols to accommodate for the backscatter reflection rate. While this may ensure that at least one whole symbol is in a reflective or non-reflective state, it does not ensure that all OFDM symbols are non-corrupted.

By leveraging knowledge from the previous step— namely when an RFID packet starts as well as the RFID's switching frequency—the CE may automatically detect and discard erroneous channel estimates. In doing so, the CE may retain only the channel estimates that are obtained when the RFID is reflecting or not reflecting, while eliminating estimates corrupted by RFID state transitions.

Figure 5:
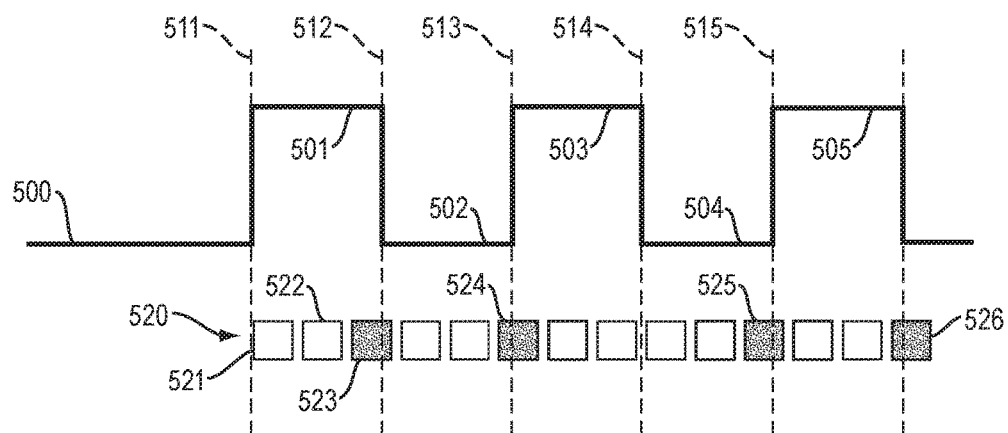
FIG. 5 illustrates selecting OFDM symbols that occur entirely during a period in which an RFID tag node is transitioning between reflective states.

FIG. 5 illustrates selecting OFDM symbols that occur entirely during a period in which a backscatter node is not transitioning between reflective states. In the example shown in FIG. 5, a modulated signal 500 reflects from a backscatter node. During time intervals 501, 503, 505, the backscatter node is in a first reflective state. During time intervals 502, 504, the backscatter node is in a second reflective state. The backscatter node may be more reflective (and thus amplitude of modulated signal 500 may be greater) during the first reflective state than during the second reflective state. At edges 511, 512, 513, 514, 515, the backscatter node may transition between the first and second reflective states. In FIG. 5, the OFDM symbols 520: (a) are each shorter in duration than a single time interval (e.g. 501, 503, 505) throughout which the backscatter node remains in the first reflective state; and (b) are each shorter than a single time interval (e.g. 502, 504) throughout which the backscatter node remains in the second reflective state. For instance, the duration of each OFDM symbol may be shorter than one half of the multiplicative inverse of the backscatter link frequency of the backscatter node. Because of the short duration of each of the OFDM symbols, at least a subset of the OFDM symbols may occur entirely during a period in which a backscatter node is not transitioning between reflective states. For instance, OFDM symbols 521 and 522 may each occur entirely during period 501 while the backscatter node remains in the first reflective state. Edge transitions (e.g., 511, 512, 513, 514, 515) may occur during a subset of the OFDM symbols (e.g., during OFDM symbols 523, 524, 525, 526) and may corrupt channel estimates of these OFDM symbols. These corrupted channel estimates may be disregarded. Alternatively, the OFDM symbols may be transmitted only at times such that (a) each of the transmitted OFDM symbols occurs entirely in a first reflective state or in the second reflective state; and (b) an edge transition does not occur during any of the transmitted OFDM symbols.

An RFID tag may communicate by switching between reflective and non-reflective states. In some implementations, a CE constructs and decodes OFDM symbols to accommodate the backscatter switching.

Channel Estimation: In some implementations, the CE estimates the RFID channels at each of the subcarriers. Note that the OFDM channel estimates H(f) comprise not only the RFID's reflection but also the direct path between the wideband transceiver's transmit and receive antennas as well as other reflections in the environment. To estimate the RFID's channel, the CE may exploit the fact that the difference between the reflective and non-reflective states is due to the RFID tag, and may subtract them from each other to obtain the RFID's channel.

Specifically, assume that after discarding the erroneous channel estimates from the preamble, the CE is left with L symbols where the RFID tag is non-reflective and M symbols where it is reflective. The channels may be estimated at each subcarrier f as:

$$\widetilde{H}_2(f) \propto \frac{1}{L}\sum_{}^{L} H(f \mid \text{reflective}) - \frac{1}{M}\sum_{}^{M} H(f \mid \text{non-reflective})$$

Note that in the above equation, the average may be calculated based on the reflective states and non-reflective states of a single RFID response.

To improve the efficiency of the wideband estimation process, the OFDM-based demodulation may be performed over only the short interval of time during which the RFID's response is expected, rather than over the entire duration of the P&C reader's communication session. Specifically, the receiver of the wideband transceiver may open a short time window immediately after the P&C reader finishes transmitting its query command. For instance, this window may be 300 μs-long in comparison to the 2 ms-long communication session. As a result, this synchronous architecture may save significant computational resources (e.g., by 6.6×), allowing the CE to achieve ultra-high frame rates and ultra-low latency.

In some cases: (a) the wideband transceiver's transmitter and receiver are connected to the same oscillator; and (b) thus the estimated channels do not have any carrier frequency offset (CFO) or sampling frequency offset (SFO).

In some cases: (a) the wideband transceiver transmits the same OFDM symbol back-to-back to estimate the channel; and (b) thus each OFDM symbol may act as a cyclic prefix for the subsequent one.

In some cases: (a) the wideband transceiver's transmit and receive antennas are co-located; (b) the line-of-sight signal dominates the channel estimate, and (c) sampling offset (or packet detection delay) between the transmitted and received OFDM symbols is minimal or non-existent.

To correct for any sample offsets introduced by the hardware channel, the CE may perform a time-domain correlation that detects the beginning (i.e., first sample) of the first OFDM symbol. Moreover, the CE may perform a one-time calibration with a known RFID location in order to eliminate other over-the-wire hardware channels.

The CE may drop the DC subcarrier because the DC subcarrier is less robust to noise, and because dropping the DC subcarrier may improve the dynamic range of the ADC (Analog-to-Digital Converter).

To further improve its signal-to-noise ratio (SNR), the CE may employ an Exponential Moving Average (EMA) on the channel estimates. The EMA may provide more robust channel estimates. This in turn may enable a neural network to achieve higher accuracy in classification.

Classification by Neural Network

In illustrative implementations of this invention, a neural network is trained to distinguish between classes of contents of a container. For instance, the neural network may be trained to distinguish between any one or more of the following types of contents of a container: (a) between grain alcohol and methanol; (b) between authentic baby formula and adulterated baby formula (e.g., between Enfamil® Neuropro® Infant Formula and the same formula adulterated with water and melamine); (c) between an authentic medicine and a fake medicine (e.g., between a Tylenol® liquid medicine and the same liquid medicine mixed with diethylene glycol); (d) between a sample of a brand of perfume and a sample of a knockoff of that brand of perfume; (e) between different wine vintages (e.g., between wine from the same vineyard but from different years); and (f) between different brands of soft drinks.

Synthetic Data

In some implementations of this invention, at least two neural networks are employed. A first neural network classifies the contents of a container. A second neural network—which is a generative model—generates synthetic data that is employed to help train the first neural network.

In some implementations, it is desirable to use a large training dataset to train the first neural network (to classify the contents of the container). This is because increasing the size of the training dataset tends, in some cases, to increase the accuracy of classification by the first neural network.

The "real" dataset—that is, channel estimates derived (by standard channel estimation) from measurements taken by the wideband transceiver—may have too few datapoints to be used, by itself, as the training dataset.

To help create a large training dataset, the second network (generative model) may generate synthetic data. The "real" data and the synthetic data may together comprise the training dataset that is used to train the first neural network (to classify contents of a container).

Generative Model

In some implementations, the generative model (which generates the synthetic data) comprises a variable autoencoder (VAE). For instance, the generative model may comprise a VAE as described in: (a) Kingma, D., et al., *Auto-encoding Variational Bayes*, arXiv:1312.6114v10 (2014); or (b) Rezende, D. et al., *Stochastic Backpropagation and Approximate Inference in Deep Generative Models*, arXiv:1401.4082v3 (2014). Or, for instance, the generative model may comprise any other version of VAE, such as: (a) a β-VAE (e.g., a VAE with an adjustable hyperparameter β that modulates learning parameters); (b) a VQ (vector-quantized) VAE; (c) a VQ-VAE-2 (e.g., a VQ-VAE with a PixelCNN prior fitted over a latent space); or (d) a TD (temporal difference) VAE.

Alternatively, the generative model (which generates the synthetic data) may comprise GAN (generative adversarial networks), also known as GANs. For instance, the generative model may comprise GAN as described in Goodfellow, I., et al., *Generative Adversarial Networks*, arXiv:1406.2661v1 (2014). Or, for instance, the generative model may comprise any other version of GAN, including: (a) CGAN (conditional GAN); (b) Cycle-Consistent GAN; (c) DAGAN (data augmentation GAN); or (d) DCGAN (deep convolutional GAN).

System with Variable Autoencoder and Transfer Learning

In some implementations of this invention, a machine learning system includes a VAE (variable autoencoder), a feature encoder and a classifier. The feature encoder may be programmed in such a way as to facilitate transfer learning.

The VAE may generate synthetic data regarding a large number of multipath environments. This synthetic data may be transformed into synthetic channel estimates, by embedding data derived from measurements of the container's contents that are taken while the container is in a line-of-sight environment.

During training, the feature encoder may take as input both: (a) the synthetic channel estimates and (b) channel estimates derived (by standard channel estimation) from measurements taken by the wideband transceiver. After training, the feature encoder may take channels estimates derived from measurements taken while the container contains an unknown material. The feature encoder may extract features for use in classification. The feature encoder may comprise multiple layers.

The classifier may take as input the features outputted by the feature encoder, and may output the classification results.

Advantageously, a VAE has the ability to generalize using a small input dataset. The VAE may assume that the input features represent a much lower dimensional space of latent variables. In the context of system's learning tasks, the wireless propagation factor may be caused by a small number of reflectors and scatterers in the environment. However, the reflectors and scatterers may change across different environments, resulting in different channel responses. The VAE may capture this phenomenon by assuming that the latent variables are randomly drawn from a normal distribution. Once the underlying distributions are learned, the system may draw new samples from them to generate synthetic data for unseen multipath environments.

We now describe how the VAE may be employed in a system that classifies the contents of a container, based on reflected RF signals from an RFID tag that is attached to the outside of the container.

In illustrative implementations, the wireless channel is impacted by both: (a) the relative permittivity of the content of the container, which in turn affects the gain of the RFID tag's antenna; and (b) the wireless signal propagation (due to reflection, scattering, and diffraction). The overall wireless channel may be expressed as a product of the gain $G(\varepsilon,k)$ and the propagation $P(k)$ characteristics as follows:

$$h_k = G(\varepsilon,k) \cdot P(k)$$

In illustrative implementations, the presence of other nearby objects (that are further than two wavelengths from the RFID tag) does not impact the tag's antenna gain, but instead affects the wireless propagation factor $P(k)$. This is because the electromagnetic interaction of antennas with different objects in the environment depends on the distance between the antenna and the objects. If an object is in the near-field (i.e., within one wavelength), it "couples" with the antenna and impacts its gain. If the object is in the far-field (i.e., larger than two wavelengths), it impacts the propagation $P(k)$. (In the UHF ISM band, the wavelength is about 30 cm. This wavelength may become significantly smaller in liquids due to the impact of the relative permittivity).

The system may incorporate the impact of container contents into the gain while absorbing environmental multipath into the propagation factor.

If the location and multipath environment are fixed, then any change in the measured channel $h_k$ may be attributed to the gain $G(\varepsilon,k)$ and thus be used directly to infer the contents. Similarly, if the content of a container is fixed, then any change in the measured channel can be attributed entirely to the multipath environment $P(k)$. The channel of the RFID tag may be measured in two scenarios: one in a line-of-sight (LOS) controlled environment with little to no-multipath ($h_{k,LOS}$), and another in a multipath-rich environment ($h_{k,MPATH}$). The ratio of these measurements may be entirely dependent on the multipath environment and independent of a container's contents. Specifically:

$$\frac{h_{k,MPATH}}{h_{k,LOS}} = \frac{P_{MPATH}(k)}{P_{LOS}(k)}$$

We sometimes call this the multipath kernel function. For simplicity, the approximation of $P_{LOS}(k) \approx 1$ may be used for the line-of-sight propagation factor.

The VAE may take as input the channel ratios, each of which consists of a multi-dimensional vector $x_1, x_2, \ldots, x_n$, and outputs a reconstruction of these features $\hat{x}_1, \hat{x}_2, \ldots, \hat{x}_n$. The VAE may comprise an encoder (which aims to compress these features into latent variables $z_1, z_2, \ldots, z_m$) and a decoder (which aims to reconstruct the input from the latent variables). By compressing and decompressing the input, the VAE may learn a representative lower-dimensional distribution of the latent variables.

During training of the VAE, the VAE may learn parameters of the neural network that (1) minimize the reconstruction loss between the input x and output $\hat{x}$, and (2) model the underlying distribution of the latent variables $q_\theta(z|x)$ as a normal distribution. This may be achieved by minimizing the following loss function:

$$L(\phi,\theta,x_i) = KL(q_\theta(z|x_i) \| \mathcal{N}(0,1)) + \mathcal{L}(x,\hat{x})$$

where KL is Kullback-Leibler divergence which is a measure of the difference between two probability distributions, $\mathcal{N}(0,1)$ denotes the gaussian with zero mean and standard deviation of 1, and $\mathcal{L}$ represents the L2 norm in frequency domain of the reconstruction loss.

In illustrative implementations of this invention, the VAE input and output are independent of the content of the container. Hence, the VAE may be trained on any container content (or even on empty containers), and its output may be used for any classification task as we explain below.

Once the VAE has been trained, the VAE may generate synthetic multipath environments by randomly drawing samples z from the latent distributions and passing them through the decoder. In illustrative implementations, the VAE's synthetic output is not directly used to train a contamination classifier (e.g., not directly used to train a fake alcohol classifier). This is because, in illustrative implementations of this invention, the features outputted by the VAE are independent of the container's content.

In some cases, the inverse of the multipath kernel may be applied to the output of the VAE, in order to generate synthetic channel estimates incorporate the impact of both the content and the RF propagation environment. To do so, channel estimates $k_{k,LOS}$ may be calculated (by standard channel estimate techniques) based on measurements that are taken by a wideband transceiver and that measure RF reflections from an RFID tag. These measurements may be in a line-of-sight setting, while a RFID tag is placed on a bottle that holds material A and then while a RFID tag is placed on a bottle that contains material B. The channel estimates $h_{k,LOS}$ may be multiplied by the output features of the VAE to create the synthetic channel estimates. The VAE may stochastically generate different multipath environments. Thus, based on a small measurement dataset of $h_{k,LOS}$, the VAE may output data that is used to generate a large number of realistic channel estimates. These realistic channel estimates may be fed as input into the classifier network. Hence, the VAE model may provide a large corpus for training the classifier network without requiring measurements for every multipath environment and contaminant.

Figure 6:
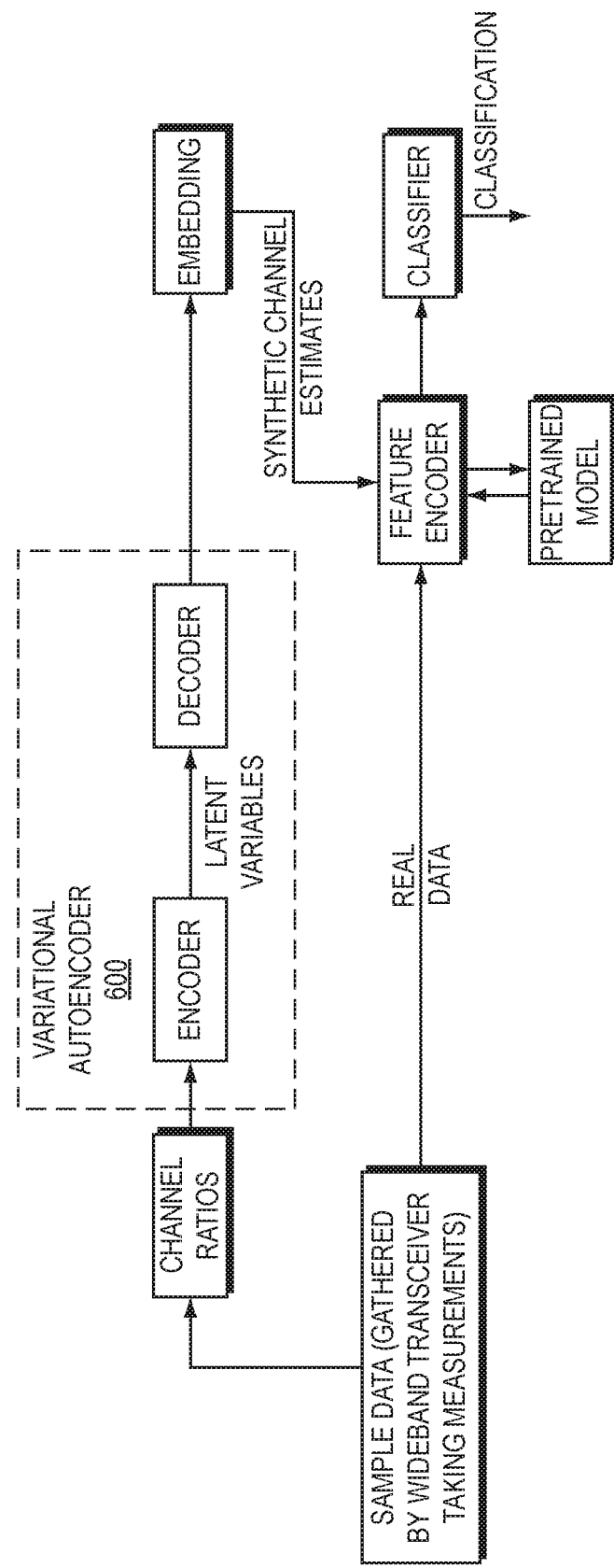
FIG. 6 shows a machine learning system that includes a variational autoencoder.

FIG. 6 shows a machine learning system that includes a variational autoencoder 600, in an illustrative implementation of this invention.

FIG. 9 is a flowchart for a method of classifying the content of a container, in illustrative implementations of this invention. In FIG. 9, the method includes at least the following steps: Employ wide-band sensing to measure frequency responses from an RFID tag attached to the outside of a container, including frequency responses for various contents of the container. In the wide-band sensing, a first radio signal powers the RFID tag and a second radio signal may be employed for sensing. The first signal may be transmitted at a high power at a frequency in the UHF ISM band. The second signal may be transmitted at a low power in a different, much wider frequency band (Step 901). Calculate channel ratios, based on the measurements. Feed the channel ratios into a variational autoencoder (VAE). Calculate synthetic channel estimates by embedding, into the output of the VAE, information about contents of the container. (Step 902). Employ a training dataset to train a neural network. The training dataset includes both the synthetic channel estimates and channel estimates derived from actual measurements. (Step 903). Once the neural network is trained, employ wide-band sensing to measure a frequency response from an RFID tag attached to the outside of a container that contains unknown content. Calculate new channel estimates, based on the new measurements. Feed the new channel estimates into the trained neural network. The trained neural network classifies the unknown content (Step 904). After a first neural network is trained to perform a first classification task, a second neural network may be trained to perform a second classification task, in such a way that weights of some but not all layers of the second neural network (a) are set equal to weights of corresponding layers of the first neural layer and (b) after being set, remain constant during the training of the second neural network. (Step 905).

Figure 11:
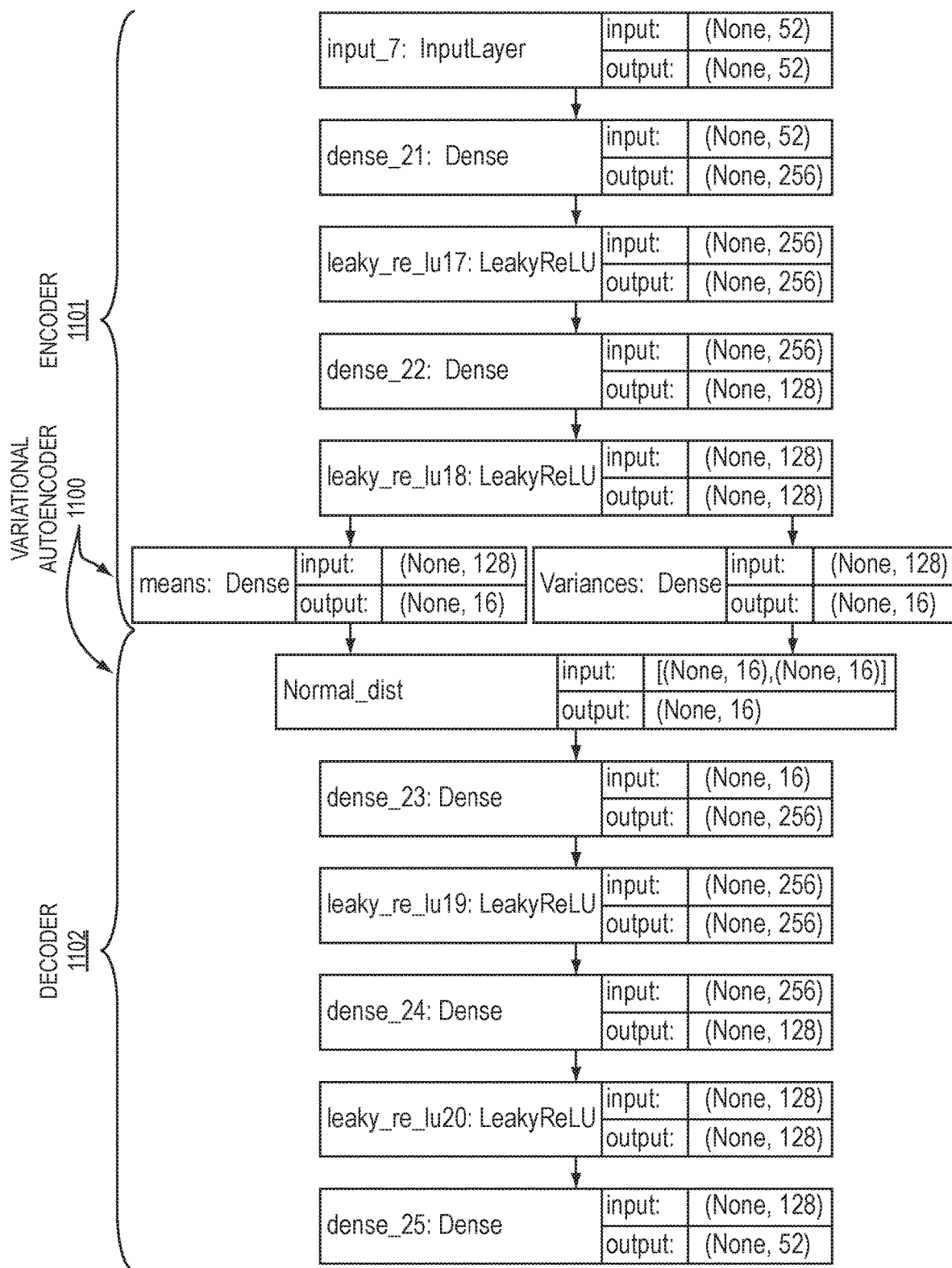
FIG. 11 shows layers in a variational autoencoder.

FIG. 11 shows layers in a variational autoencoder, in an illustrative implementation of this invention. In FIG. 11, a variational autoencoder 1100 includes an encoder 1101 and a decoder 1102.

Figure 12:
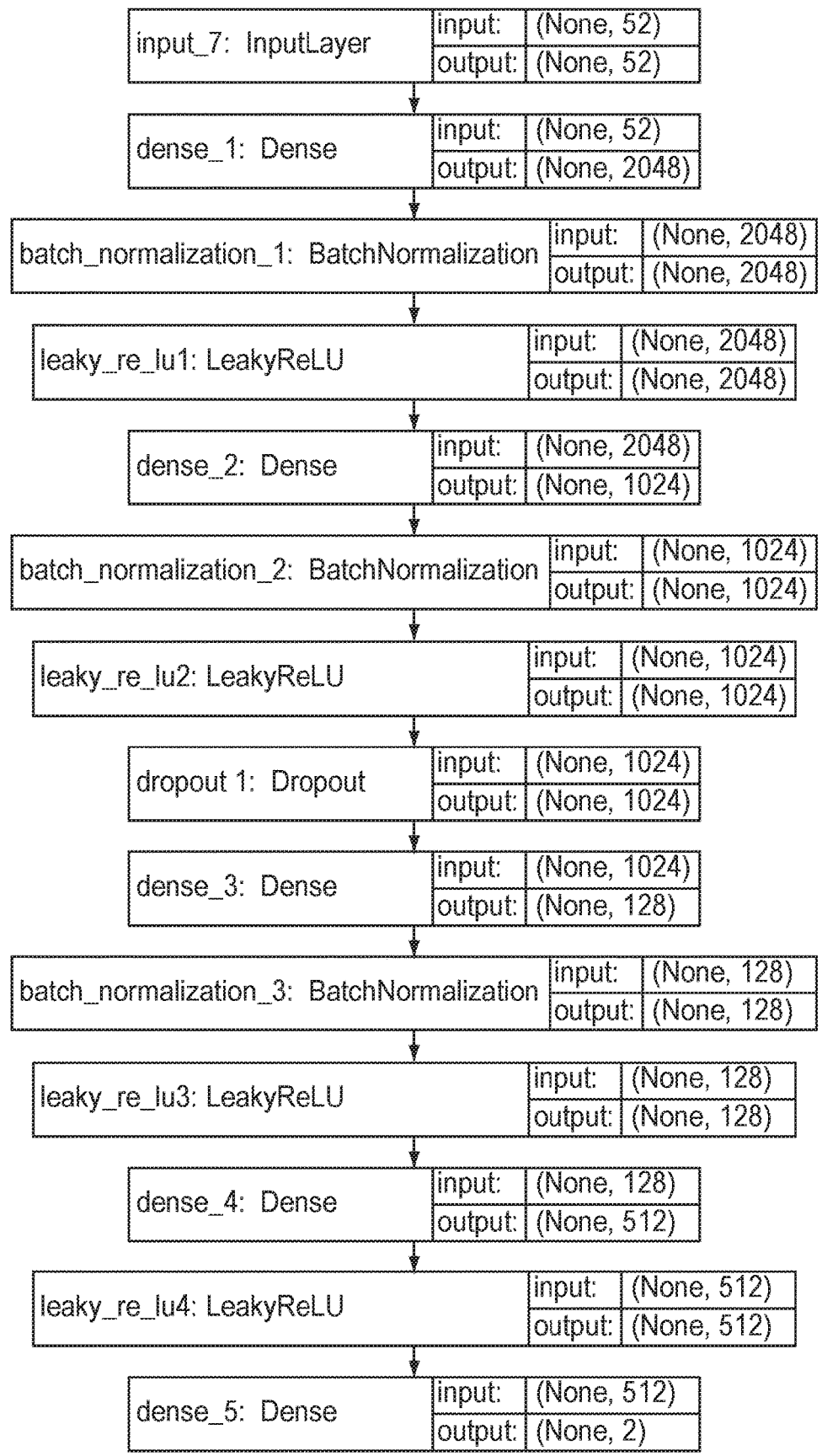
FIG. 12 shows layers in a feature encoder and classifier.

FIG. 12 shows layers in a feature encoder 1201 and material classifier 1202, in an illustrative implementation of this invention.

The neural networks shown in FIGS. 11, 12, 14A, 14B, 15A and 15C are non-limiting examples of this invention. This invention may be implemented in many different ways. Among other things, the number of layers, number of nodes, and activation functions of the neural networks (and the type of neural networks) may be different than those shown in FIGS. 11, 12, 14A, 14B, 15A and 15C.

Prototype

The following six paragraphs describe a prototype of this invention.

In this prototype, the radios (including RFID reader and wideband transceiver) are implemented on USRP a low-pass filter at X310 and N210 software radios and perform two-frequency excitation. The radios run the EPC-Gen2 protocol and transmit two frequencies: one high power frequency (10-31 dBm) inside the UHF ISM band and another low power sensing frequency which is varied within 500-1000 MHz. At the sensing frequency's receiver (i.e., wideband transceiver), a low-pass filter eliminates the impact of the power up frequency and an LNA (low noise amplifier) boosts the received signal power. To reduce the harmonics of transmitters, the output of the transmit USRPs® is filtered by a low-pass filter. Also, anti-aliasing low-pass filters are used at the input of the receive USRPs®. The received signal is sampled (digitized) and sent over Ethernet® to a computer for offline processing.

In this prototype, software is implemented in MATLAB® and Python®. The transmitted query requests the extended RFID preamble, and the receiver averages 50 RFID responses to further boost the signal-to-noise ratio (SNR). The receiver decodes the response and performs standard channel estimation using the packet preamble. It repeats this process over 26 frequencies, spaced at 20 MHz intervals, across RF-EATS's 500 MHz frequency span. This results in feature vectors which include amplitude, phase, and correlation across frequencies. The multipath kernel is applied by dividing the multipath-affected data by line-of-sight measurement data ($h_{k,MPATH}/h_{k,LoS}$). The number of datapoints for training generated is much larger than the number of measurements due to the combinatorial relationship.

In this prototype, to ensure the reliability of the channel measurements (i.e., that the channel estimates were not significantly distorted by noise or interference), the correlation is computed at each frequency k as:

$$\text{corr}_k = \sum_t y_t p_t^* \Big/ \sqrt{\sum_t |y_t|^2 \sum_t |p_t|^2}$$

where $p_t$ is the known preamble of the RFID packet and $y_t$ is the received signal. Points that have a correlation that is extremely low ($\leq 0.6$) are discarded. The classifier and refiner are implemented in a Python® implementation of the PyTorch and Keras package.

In this prototype, the classifier is implemented as a fully-connected network with 3 hidden layers. Dropout and batch normalization layers are added to minimize overfitting. For the classifier, an Adam optimizer is employed and learning rate=1e-4, beta1=0.9, beta2=0.999, dropout rate=0.2.

In this prototype, a variational autoencoder (VAE) is employed. The VAE includes an encoder and decoder. The encoder and decoder are implemented as fully-connected networks with 3 hidden layers each. The dimension of latent variable is set to 16. For the VAE, an Adam optimizer is employed and learning rate=1e-7, beta1=0.9, beta2=0.999, dropout rate=0.2.

Tests were performed to evaluate how accurately the prototype classifies the unknown content of a container, to which an RFID tag is attached. The test results show that, when training and testing were performed in the same environment, the prototype achieved an accuracy of at least 90% for all classification tasks that were tested. Furthermore, the test results show that, when testing was performed in new and unseen environments, the prototype achieved an accuracy of at least 90% for six out of eight classification tasks.

The prototype described in the preceding six paragraphs is a non-limiting example of this invention. This invention may be implemented in many other ways.

Transfer Learning

In illustrative implementations of this invention, transfer learning may be employed when training a neural network to classify a new set of materials. A multi-layered neural network may be divided into common layers (shared by all tasks) and task-specific layers. In order to learn a new task (e.g., detecting fake alcohol), the neural network may inherit the common layers from a well-trained model (e.g., the baby formula model) and retrain only the task-specific layers. This may reduce the number of samples required to extend the model to new materials (contents of containers), and may enable the neural network to achieve near-optimal accuracy even when the dataset from a new content is limited.

In illustrative implementations, the neural network extends to new classification tasks in a sample-efficient manner. For example, having trained a classifier to detect fake alcohol using a large dataset, the classifier may be further trained to detect adulterated baby formula using a small number of samples. The transfer learning (in which common layers are re-used, with "frozen" weights) may enable the number of measurements taken to train the classifier for a new classification task to be less than the number of measurements taken to train the classifier for the initial classification task.

In some implementations, transfer learning may be employed to transfer training knowledge from a well-trained source domain (e.g., alcohol) to a new target domain (e.g., baby formula).

Recall that a neural network comprises multiple layers, some of which are used for feature extraction or encoding, and others which are used for classification. The feature extraction layers themselves may be further divided into common layers and task-specific layers. The common layers can be directly transferred as "frozen" layers F from a well-trained classifier to the target domain. This significantly reduces the number of parameters that need to be learned for the new task, thus reducing the required dataset size to achieve high accuracy.

Mathematically, each domain may be represented as $$(X_s, y_s) = \{(x_{s,i}, y_{s,i})\}_{i=1}^{N_s}$$

$$(X_t, y_t) = \{(x_{t,i}, y_{t,i})\}_{i=1}^{N_t}$$

where $X_s$ and $y_s$ are the observations and respective labels of source content domain, $X_t$ and $y_s$ are datasets and labels of target content domain, $x_i$ represents the complex channel estimate of one observation over different frequencies, $y_i$ represent the label (e.g., contaminated or not), $N_s$ is the number of samples in the source content domain and $N_t$ is the number of samples in the target content domain.

Assuming the latent space dimensionality is d, the feature encoder and source/target classifier may be represented as:

$$F: \mathbb{R}^n \to \mathbb{R}^d$$

$$G_s \circ F_s: \mathbb{R}^d \to \{0, 1, \ldots, C_s\}$$

$$G_t \circ F_t: \mathbb{R}^d \to \{0, 1, \ldots, C_t\}$$

where n comes from the dimension of the input data, $C_s$, $C_t$ represents the number of classes in the source and target content domains respectively, and ∘ represents function composition.

In transfer learning, after training the model on the source content domain, the weights of F may be fixed. A computer may calculate $\hat{y}_t = G_t \circ F_2 \circ F(X_t)$, and then minimize the loss $$\mathcal{L}_t(y_t, \hat{y}_t) = -\sum_{i=1}^{C} p(y_{t,i}) \log p(\hat{y}_{t,i}),$$

where $y_{t,i}$ and $\hat{y}_{t,i}$ represent the actual and predicted label for class i, and where $p(\hat{y}_{t,i})$ is the predicted probability of a given label. Thus, in some cases, only the weights of $F_2$ and $G_t$ are updated, while the weights of F remain intact.

Figure 7:
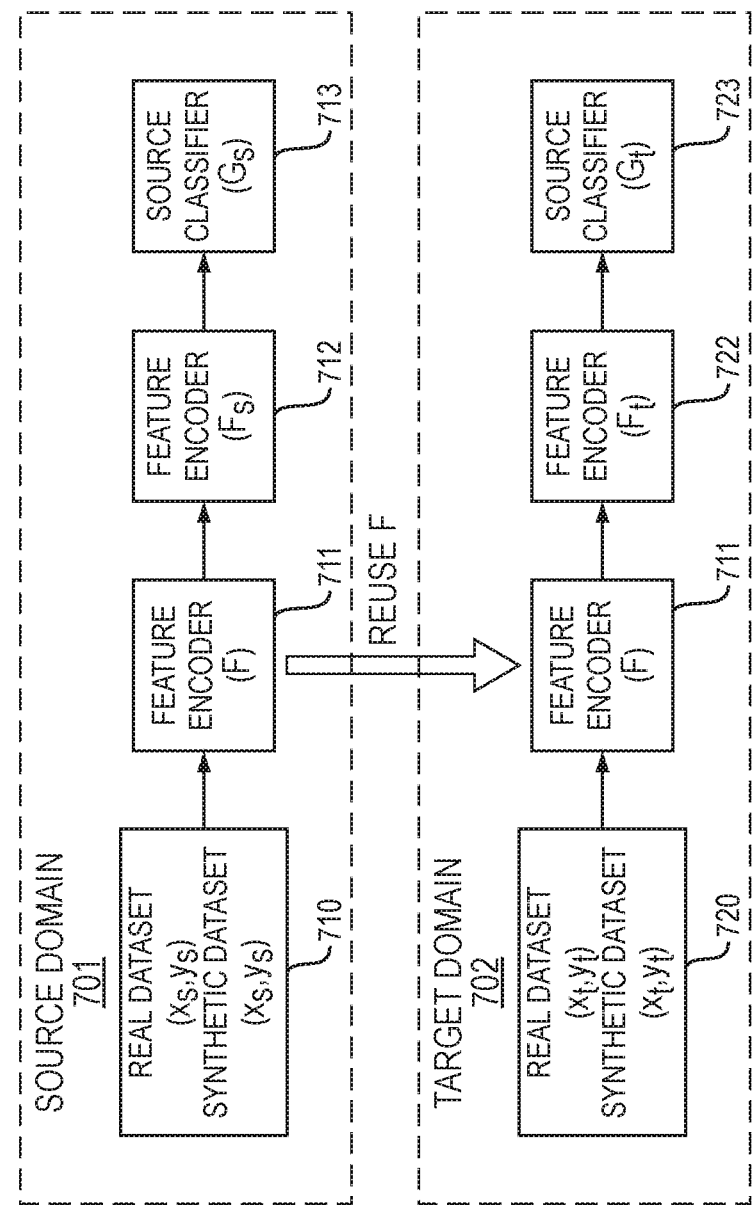
FIG. 7 illustrates transfer learning.

FIG. 7 illustrates transfer learning, in an illustrative implementation of this invention. In FIG. 7, a neural network is initially trained to classify materials in a source domain 701. The source domain 701 may comprise types of materials (e.g., grain alcohol and methanol). The neural network may be trained on a training dataset 710 that comprises both real and synthetic data for source domain 701. The trained neural network in the source domain may include both: (a) a classifier ($G_s$) 713 and (b) common layers (F) 711 and task-specific layers ($F_s$) 712 of a feature encoder.

In FIG. 7, a neural network is subsequently trained to classify materials in a target domain 702. The target domain 702 may comprise new types of materials (e.g., diethylene glycol and Tylenol® liquid medicine). These new types of material may be different than those which the neural network initially trained to classify.

In FIG. 7, the common layers (F) of the feature encoder may be re-used "as is" when the neural network is later trained to classify materials in target domain 702. In other words, the weights for the common layers (F) 711 may be "frozen" (kept the same in target domain 702 as in source domain 701.

In FIG. 7, training dataset 720 comprises real and synthetic data for the target domain 720. The training dataset 720 may be employed to train the neural network for a new task (to classify materials in target domain 702). The classifier ($G_t$) 723 and task-specific layers ($F_t$) 722 of the feature encoder may be trained for this new task, by adjusting weights for the classifier and task-specific layers. However, during training for this new task, the common layers (F) 711 may be inherited from the source domain without change (that is, the weights for the common layers (F) 711 may be frozen).

Anomaly Detection

In examples discussed above, the classifier is trained on samples from all classes of interest (e.g., both authentic samples and counterfeit/adulterated samples).

However, in many use scenarios, it may be impractical to obtain access to counterfeit or contaminated samples, or the composition/type of contaminant may be unknown. In such use scenarios, it may be desirable to employ a VAE as an anomaly detector.

Recall that the VAE is trained to minimize the reconstruction loss of the environment-dependent features. Hence, if the input to the VAE encodes environment-dependent features, we expect the reconstruction loss to be low. On the other hand, if the input deviates from the expected distribution, the reconstruction loss may be high, indicating an anomaly.

To see how this can be used to detect counterfeiting, consider the case of a manufacturer that creates a database of $h_{k,LOS}$ measurements of the authentic product. If the channel $h_{k,c}$ of a counterfeit product is measured, and the multipath kernel is applied to it, we obtain:

$$\frac{h_{k,MPATH}}{h_{k,LOS}} = \frac{P_{MPATH}(k)}{P_{LOS}(k)} \times \frac{G(\varepsilon', k)}{G(\varepsilon, k)} \quad \text{(Equation 2)}$$

where $\varepsilon$ the relative permittivity of the authentic product and $\varepsilon'$ is the relative permittivity of the counterfeit content.

In the case described in the preceding paragraph, the impact of the container content does not cancel out upon applying the multipath kernel, and the resulting ratio is not only dependent on the environment P, but also on the content. If this is fed as input to the VAE, we expect a high reconstruction loss since the sample deviates from the learned distribution. In contrast, if the sample were authentic, the ratio will be free of the impact of the container contents and the reconstruction loss with be lower.

FIG. 8 shows an algorithm for anomaly detection using a variational autoencoder.

Figure 10:
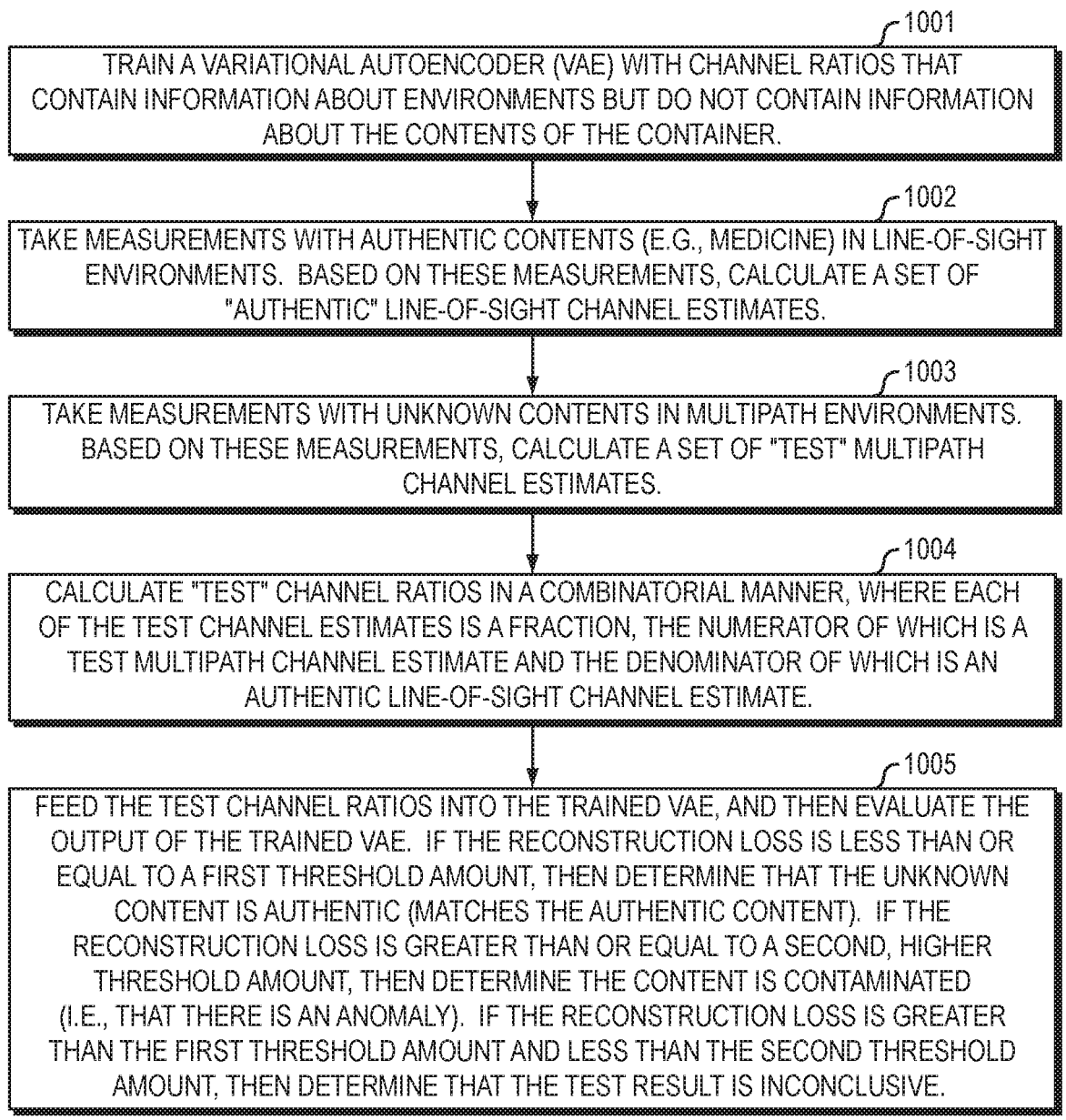
FIG. 10 is a flowchart for a method of detecting an anomaly in the content of a container.

FIG. 10 is a flowchart for a method of detecting an anomaly in the content of a container. In the example shown in FIG. 10, the method includes at least the following steps: Train a VAE with channel ratios that contain information about environments but do not contain information about the contents of the container (Step 1001). Take measurements with authentic contents (e.g., medicine) in LOS environments. Based on these measurements, calculate a set of "authentic" LOS channel estimates (Step 1002). Take measurements with unknown contents in multipath environments. Based on these measurements, calculate a set of "test" multipath channel estimates (Step 1003). Calculate "test" channel ratios in a combinatorial manner, where each of the test channel estimates is a fraction, the numerator of which is a test multipath channel estimate and the denominator of which is an authentic LOS channel estimate (Step 1004). Feed the test channel ratios into the trained VAE, and then evaluate the output of the trained VAE. If the reconstruction loss is less than or equal to a first threshold amount, then determine that the unknown content is authentic (matches the authentic content). If the reconstruction loss is greater than or equal to a second, higher threshold amount, then determine the content is contaminated (i.e., that there is an anomaly). If the reconstruction loss is greater than the first threshold amount and less than the second threshold amount, then determine that the test result is inconclusive (Step 1005).

Direct Use of Channel Estimates

In some implementations of this invention: (a) a generative model (e.g., VAE or GAN) is omitted; and (b) channel ratios are employed directly for generating a large database of synthetic channel estimates that are in turn used to train a classifier. For instance, channel ratios may be computed in accordance with Equation 1 and may be independent of the contents of a container (i.e., contain information about environments but not about the contents). Instead of feeding these channel ratios into a generative model, these channel ratios may instead undergo embedding. In the embedding, a channel ratio may be multiplied by a LOS channel estimate (for a known material) to create a synthetic channel estimate (for that material). A large number of synthetic channel estimates may be generated in this way. This is because the embedding and the channel ratios may be computed in a combinatorial manner. For instance, if one has a first set of LOS channel estimates for a material and a second set of multipath channel estimates for the same material, then each multipath channel estimate in the first set may be divided by each multipath channel estimate in the second set (one pair at a time), to compute a much larger set of channel ratios. For example, from a set of 10 LOS channel estimates for a material and 10 multipath channel estimates for the same material, 100 channel ratios (10×10) may be computed. Likewise, during embedding, if one has a third set of channel ratios and a fourth set of LOS channel estimates (for a specific material), then each channel ratio in the third set may be multiplied by each LOS channel estimate in the fourth set (one pair at a time), to calculate a much larger set of synthetic channel estimates (for the specific material). For example, 1000 synthetic channel estimates (100×10) that are associated with material A may be computed from 100 channel ratios and 10 LOS channel estimates (where the channel ratios are independent of the material composition and the LOS channel estimates are associated with material A). The embedding may be repeated for multiple materials, resulting in a large database of synthetic channel estimates that are labeled for different materials. These labeled synthetic channel estimates may be fed (alone or together with labeled channel estimates from actual measurements) as input to a neural network, to train the network to perform classification tasks. Thus, in some cases, the channel ratios are used directly—without a VAE or GAN—to create a large training database, in order to train a classifier. In this approach, the number of measured samples may be much smaller than the number of synthetic channel estimates that are created.

Other Applications

This invention is not limited to sensing the contents of a closed container. For instance, in some implementations, channel ratios are employed (for training and testing), in a sensing system that classifies or identifies an object, or the shape of an object, or the material composition of the object, in a situation where the object is not occluded from the wideband transceiver (e.g., by the wall of a container). Likewise, in some implementations, channel ratios are employed (for training and testing), in a sensing system that classifies or identifies one or more attributes of a human who is not occluded from the transceiver. For instance, these attributes may include the human's location, gestures or physiological activity (e.g., breathing or heartbeats).

Generative Adversarial Networks

In some implementations of this invention, a GAN (generative adversarial networks) comprises a generator and a discriminator. The GAN may generate synthetic data that is employed to help train another neural network. The other neural network may, when trained, perform classification to recognize the contents of a closed container.

Figure 14A:
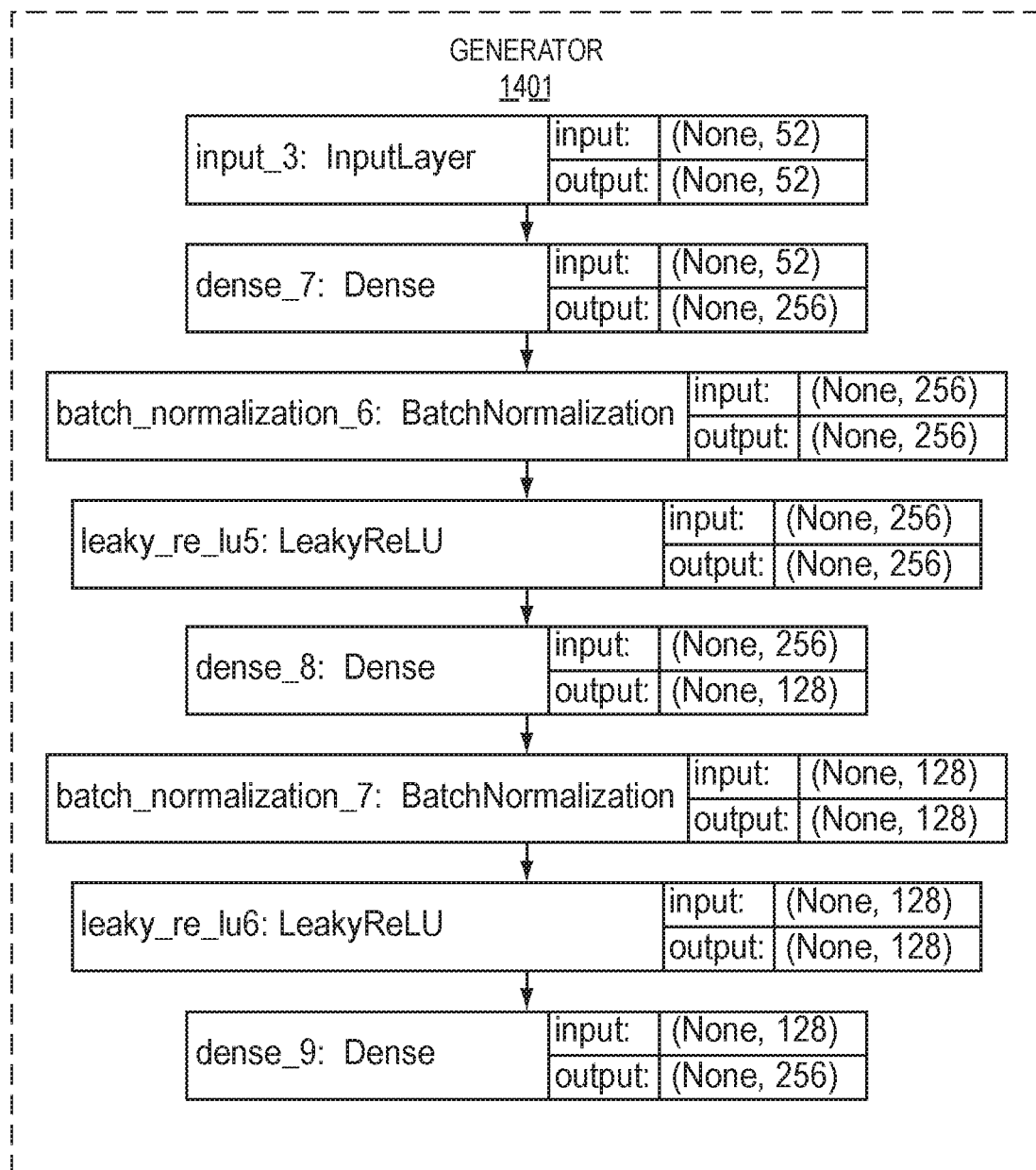
FIGS. 14A and 14B show layers in a generator and discriminator, respectively, in a generative adversarial network.
Figure 14B:
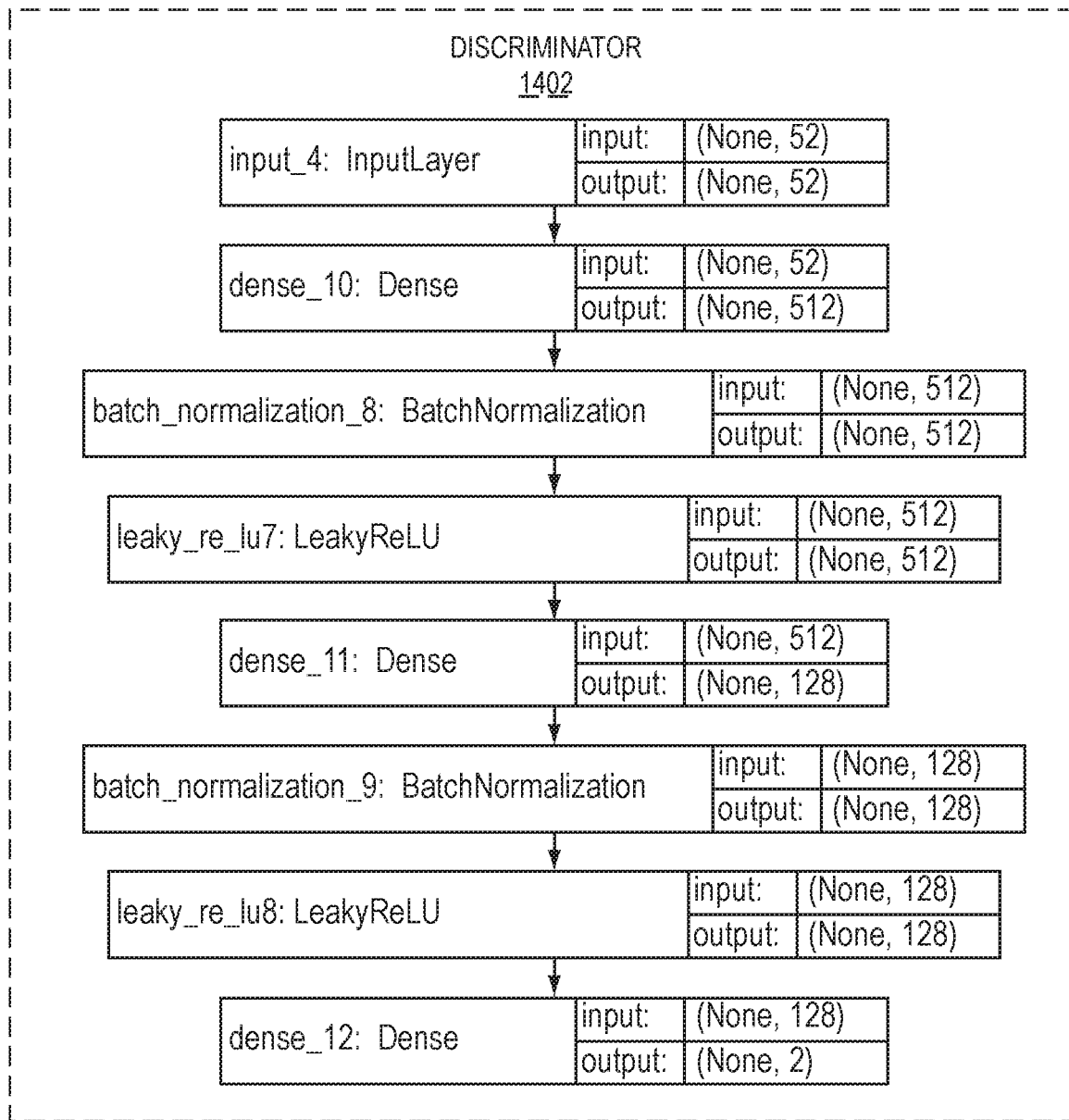

FIGS. 14A and 14B show a generator 1401 and a discriminator 1402 of a GAN, in an illustrative implementation of this invention.

Conditional Adversarial Network

In some alternative implementations of this invention, a system may include a conditional adversarial network.

The conditional adversarial network may take as input the frequency-domain channel of a received RFID signal. The conditional adversarial network may comprise a feature encoder (E), a contaminant predictor (P), and an environment discriminator (D). The encoder E may comprise a fully-connected network, which takes the wireless channel as input and outputs multi-path independent features. The encoded data may be fed to the predictor P which outputs the class prediction of input data. To remove location and multipath dependencies, the encoder E may play a minimax game against the discriminator D to prevent it from decoding the location effect from the encoded output. The input of D may be a concatenation of the output of both the encoder E and the predictor P.

The conditional adversarial network may be interpreted as a competition between a camouflage master, which tries to hide the multipath components from the received response, and a search party, which aims at detecting the traces of multipath. When the game converges, the encoder may become proficient at outputting encoded features where the multipath impact has been discarded. This may enable the model to learn the multipath-independent features from the RFID response.

In the conditional adversarial network, the feature encoder may comprise a fully-connected network. Batch normalization may be performed to normalize the mean and variance of the data at each layer, by subtracting the batch mean and dividing by the batch standard deviation. This may help the encoder E to converge quickly and may prevent overfitting. A leaky rectified linear unit (Leaky-ReLU) $y_i = \max(0.1 x_i, x_i)$ may be used as an activation function. This may be desirable, because the Leaky-ReLU may preserve some of the input data properties. The output of feature encoder z may be represented as:

$$z = E(x|\theta_E)$$

where $\theta_E$ is the set of fully-connected network parameters and x is the input feature which consists of $h_k$, the RFID's channel across frequencies.

In the conditional adversarial network, the contaminant predictor may comprise a fully-connected network and may predict the contaminant label of the encoded input z. Instead of making a hard decision on the label, the final layer may output a probability for each possible class label. This may be done using a standard softmax function $$y_i = e^{x_i} / \sum_i e^{x_i}.$$

The output of the contaminant predictor may be expressed as:

$$\hat{y} = P(z|\theta_P)$$

where $\hat{y}$ is the probability distribution of predicted contaminant class, and $\theta_P$ is the set of fully-connected network parameters of contaminant predictor.

The conditional adversarial system may try to minimize the error between the predicted class, $$\operatorname*{argmax}_c \hat{y},$$

and the ground truth y. The error may be represented by the following categorical cross-entropy loss function:

$$\mathcal{L}_P = E_y[-\log \hat{y}] = -\sum_c y_c \log \hat{y}_c$$

where $\hat{y}_c$ is the estimated probability of class c. By minimizing this categorical cross-entropy loss function, the feature encoder E and contaminant predictor P may play a cooperative game which drives the model to find network parameters for high classification accuracy.

The environment discriminator D may architecturally mirror the contaminant predictor P and hence comprise multiple fully-connected layers. The input of D may be the concatenated value of z and $\hat{y}$. Recall that a goal of a conditional adversarial model may be to remove the environmental dependency. During training, the feature encoder E and environment discriminator D may play minimax game, meaning that E is trained to "fool" D, while D is trained to discriminate the environment label. Once the model is trained, the E may produce less environment-dependent features.

In the conditional adversarial network, a cross entropy function may be employed as an error metric. This cross-entropy function may represent the loss $\mathcal{L}_d$ between the environment probability distributions ŝ and location ground truths s:

$$\mathcal{L}_d = E_s[-\log ŝ] = -\sum_l s_l \log ŝ_l$$

where $ŝ_l$ is the estimated probability on location label l.

By minimizing $\mathcal{L}_d$, the environment discriminator D may become more skilled at classifying locations.

The overall objective function may be expressed as:

$$\min_{E,P} \max_D \mathcal{L} = \mathcal{L}_p - \lambda \mathcal{L}_d$$

where λ is a hyperparameter. The overall objective function may cause the networks in E and P to be trained to minimize the overall loss $\mathcal{L}$, and cause D to be trained to maximize $\mathcal{L}$. In other words, E may hide the multipath components and reveal the contaminant label, P may classify the contaminant, and D may identify hints of multipath from the output of E.

The classifier may minimize the loss function. The training process may alternate between two phases. The first may involve fixing D's parameters $\theta_D$ and updating the parameters of E and P ($\theta_E$ and $\theta_P$) for a predefined number of iterations $\mathcal{N}_{E,P}$. The second stage may involve fixing $\theta_E$ and $\theta_P$ and updating $\theta_D$ for another predefined iterations $\mathcal{N}_D$. The training may alternate between the two stages until convergence.

Figure 13:
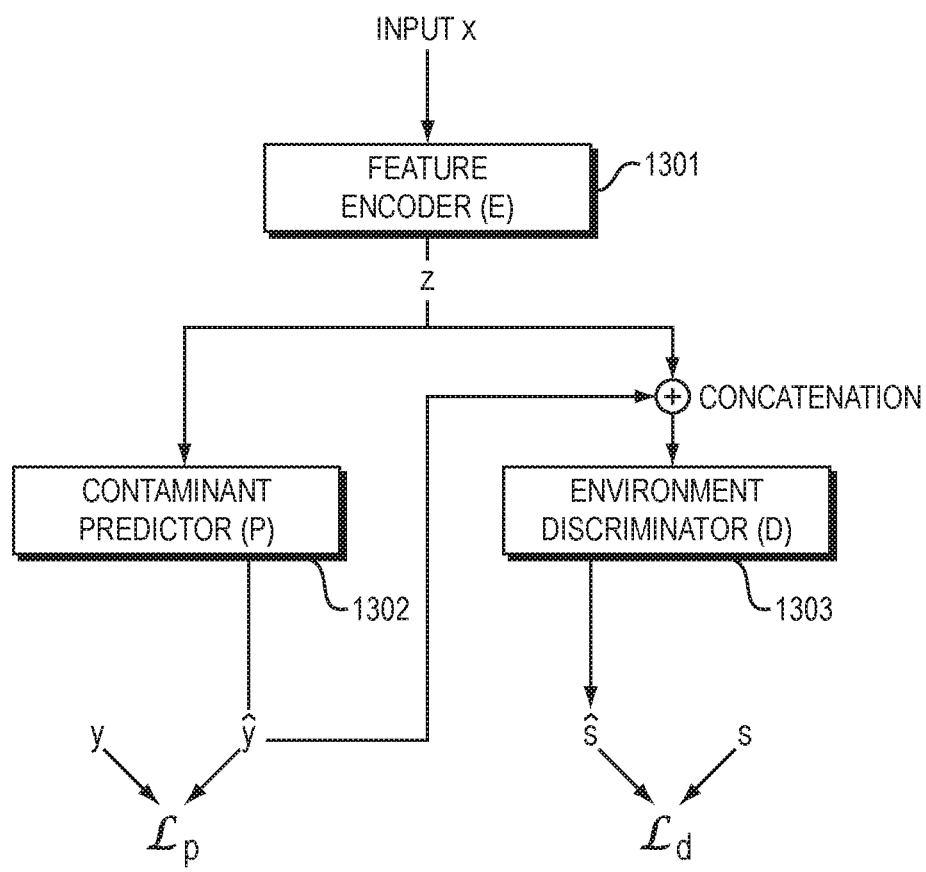
FIG. 13 shows a conditional adversarial network.

FIG. 13 shows a conditional adversarial network. In the example shown in FIG. 13, a conditional adversarial network includes a feature encoder 1301, a contaminant predictor 1302 and an environment discriminator 1303.

Figure 15A:
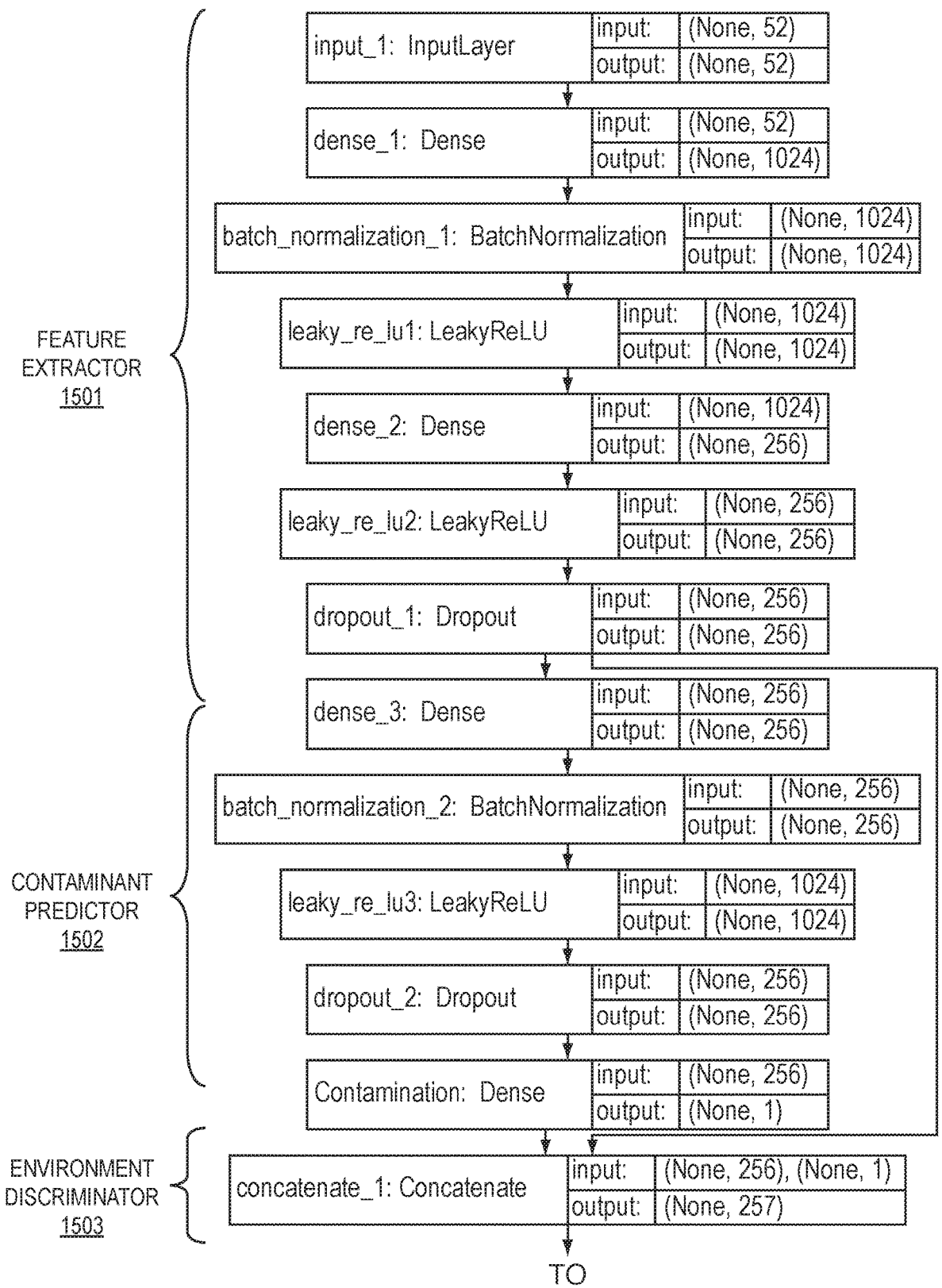
FIGS. 15A and 15B show layers in a conditional adversarial network.
Figure 15B:
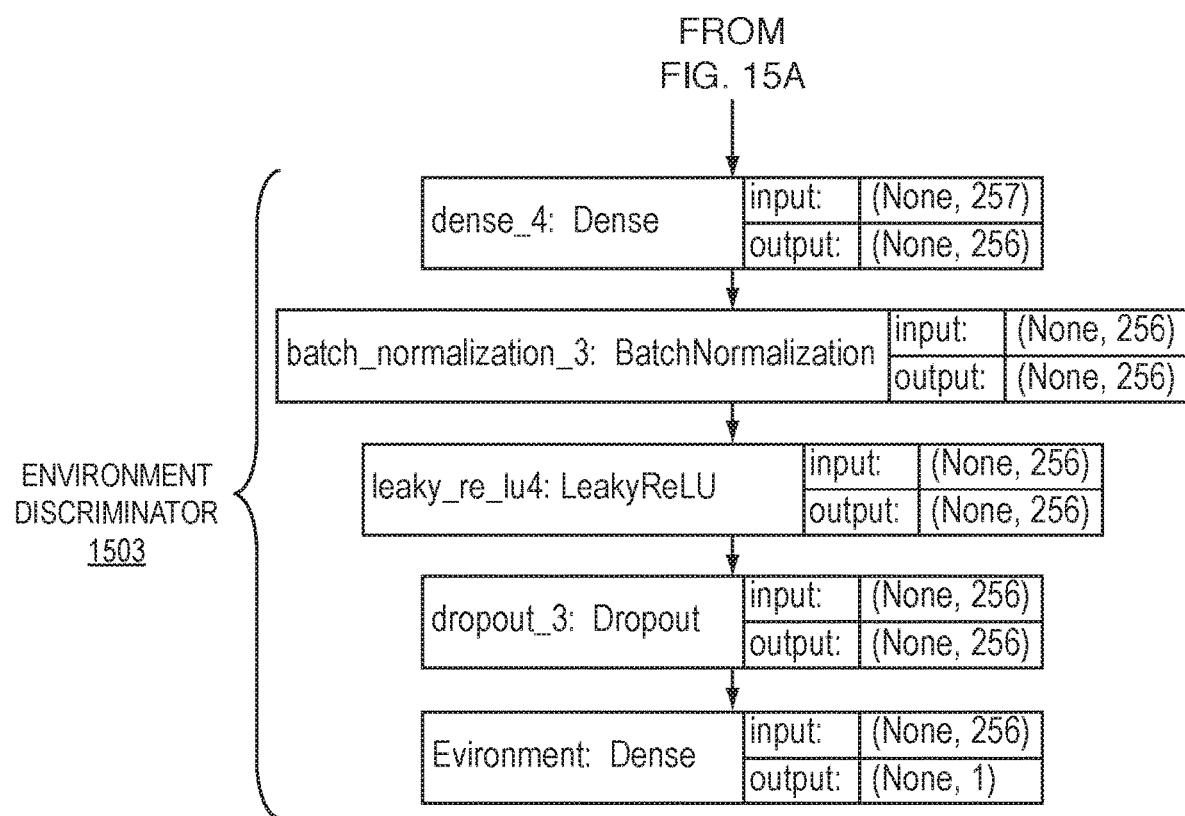

FIGS. 15A and 15B show layers in a conditional adversarial network. In the example shown in FIGS. 15A and 15B, the network includes a feature extractor 1501, a contaminant predictor 1502, and an environment discriminator 1503.

In FIGS. 13 and 15A, the environment discriminator (1303, 1503) may predict which environment. This prediction may be used to eliminate the impact of the environment on the content classification.

Environments

In some implementations: (a) a first set of measurements are taken in a line-of-sight (LOS) environment of a transceiver and a second set of measurements are taken in a multipath environment of the transceiver; (b) during each of the first set of measurements, no more than a first percentage of the RSS at the receiver is attributable to multipath propagation; (c) during each of the second set of measurements, at least a second percentage of the RSS at the receiver is attributable to multipath propagation; and (d) the second percentage is greater than the first percentage.

In some implementations: (a) a first set of measurements are taken in a set of line-of-sight (LOS) environments of a transceiver and a second set of measurements are taken in a set of multipath environments of the transceiver; (b) during each of the first set of measurements, no more than a first percentage of the RSS at the receiver is attributable to multipath propagation; (c) during each of the second set of measurements, at least a second percentage of the RSS at the receiver is attributable to multipath propagation; and (d) the second percentage is greater than the first percentage.

In some implementations: (a) a first set of measurements are taken in a line-of-sight (LOS) environment of a transceiver and a second set of measurements are taken in a multipath environment of the transceiver; (b) during each of the first set of measurements, at least a first percentage of the RSS at the receiver is attributable to line-of-sight radiation; (c) during each of the second set of measurements, no more than a second percentage of the RSS at the receiver is attributable to line-of-sight radiation; (d) the second percentage is less than the first percentage; and (e) the line-of-sight radiation consists of RF radiation that is transmitted by the transceiver, travels in a direct path to an RFID tag, reflects from the tag, and then travels in an direct path from the tag to the transceiver.

In some implementations: (a) a first set of measurements are taken in a set of line-of-sight (LOS) environments of a transceiver and a second set of measurements are taken in a set of multipath environments of the transceiver; (b) during each of the first set of measurements, at least a first percentage of the RSS at the receiver is attributable to line-of-sight radiation; (c) during each of the second set of measurements, no more than a second percentage of the RSS at the receiver is attributable to line-of-sight radiation; (d) the second percentage is less than the first percentage; and (e) the line-of-sight radiation consists of RF radiation that is transmitted by the transceiver, travels in a direct path to an RFID tag, reflects from the tag, and then travels in an direct path from the tag to the transceiver.

More Details

If a change in position of one or more physical objects relative to a transceiver causes a change in measurements taken by the transceiver, then the transceiver is in a different environment immediately after the change in position than the transceiver is in immediately before the change of position.

Here are three non-limiting examples of how a change in position could cause a change of environment: First example: If the distance between an RFID tag (e.g., 210) and a wideband transceiver (e.g., 202) is in the range of 10 cm to 20 cm, then moving the tag by even a slight increment (e.g., an increment of 30 mm to 99 mm) toward or away from the transceiver may cause a measurable impact on the signal received by the transceiver, and thus the environment of the transceiver may change. Second example: If the wideband transceiver, RFID tag, and a set of RF reflectors and RF scattterers are placed on a flat tabletop in a cubic meter area, then randomly changing the position of one or more of the RF reflectors or RF scatterers within this area may cause a measurable impact on the signal received by the transceiver, and thus the environment of the transceiver may change. Third example: Moving the wideband transceiver and tag to a different room in a building may cause a measurable impact on the signal received by the transceiver, and thus the environment of the transceiver may change.

In some implementations, each of the training measurements is performed with the same RFID tag and the same container, and this container may have different contents (or be empty) for different measurements. Alternatively, multiple containers which are very similar to each other (e.g., multiple cans that are identical within manufacturing tolerances) may be employed for training and testing.

In some implementations, one or more of the steps described herein are performed in parallel. For instance, measurements for training may be taken in parallel, with multiple transceivers and tags simultaneously gathering data that is used (a) to train a generative model (e.g., VAE) or (b) to gather LOS data for embedding. Or, for instance, testing of unknown contents of multiple containers may be performed simultaneously, sharing a single database of synthetic outputs $P_k$ of the VAE.

A "low-multipath" environment (as defined herein) is a non-limiting example of a line-of-sight (LOS) environment. A "high-multipath" environment (as defined herein) is a non-limiting example of a multipath environment.

This invention is not limited to sensing with RFID tags. For instance, the frequency response of any wideband backscatter node may be measured.

Computers

In illustrative implementations of this invention, one or more computers (e.g., servers, network hosts, client computers, integrated circuits, microcontrollers, controllers, microprocessors, field-programmable-gate arrays, personal computers, digital computers, driver circuits, or analog computers) are programmed or specially adapted to perform one or more of the following tasks: (1) to control the operation of, or interface with, one or more RFID readers or RFID transceivers, (2) to estimate channels; (3) to calculate channel ratios; (4) to generate data with a generative model; (5) to calculate synthetic channel estimates (e.g., by embedding); (6) to train a generative model, classifier, or other neural network; (7) to perform classification by employing a trained neural network; (8) to perform anomaly detection by employing a trained generative model; (9) to receive data from, control, or interface with one or more sensors; (10) to perform any other calculation, computation, program, algorithm, or computer function described or implied herein; (11) to receive signals indicative of human input; (12) to output signals for controlling transducers for outputting information in human perceivable format; (13) to process data, to perform computations, and to execute any algorithm or software; and (14) to control the read or write of data to and from memory devices (tasks 1-14 of this sentence being referred to herein as the "Computer Tasks"). The one or more computers (e.g., 203, 220) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, non-transitory, machine readable media, with instructions encoded thereon for one or more computers to perform one or more of the Computer Tasks.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, a set of electronic devices are each configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables and wiring.

In some cases, one or more computers (e.g., 203, 220) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

"Archimedes' constant" means the ratio of a circle's circumference to its diameter. Archimedes' constant is sometimes called "pi" or "π". Archimedes' constant is an irrational number that is approximately equal to 3.14159.

To compute "based on" specified data means to perform a computation that takes the specified data as an input.

"CE" or "channel estimator" is defined above.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

"Defined Term" means a term or phrase that is set forth in quotation marks in this Definitions section.

The term "e.g." means for example.

If a change in position of one or more physical objects relative to a receiver causes a change in measurements taken by the receiver, then the receiver is in a different "environment" immediately after the change in position than the receiver is in immediately before the change of position.

The phrase "each environment in the first and second sets of environments" means each environment in a group, which group consists of the first and second sets of environments.

A non-limiting example of an X doing Y in "in a set of environments" is: X doing Y in each environment in the set at a different time. In another non-limiting example: X doing Y "in a set of environments" may include X doing Y in at least some of the environments in the set simultaneously.

Each equation above may be referred to herein by the equation number set forth to the right of the equation. Non-limiting examples of an "equation", as that term is used herein, include: (a) an equation that states an equality; (b) an inequation that states an inequality; (c) a mathematical statement of proportionality or inverse proportionality; (d) a system of equations; (e) a mathematical optimization problem; or (f) a mathematical expression.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, unless the context clearly indicates otherwise, if a device has a first socket and a second socket, then the device may (or may not) have more than two sockets, and the first socket may occur in any spatial order relative to the second socket. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

A non-limiting example of "information derived from channel ratios" is weights of a neural network that are learned from the channel ratios or from information derived from the channel ratios.

As used herein, "line-of-sight propagation" means propagation of one or more RF signals from a first point to a second point, along a direct path between the first and second points.

As used herein, "multipath propagation" means propagation of one or more RF signals from a first point to a second point, along one or more paths that are not direct path(s) between the first and second points.

"# of" means number of.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

"Permittivity" means relative permittivity.

"Radio band" means the frequency band from 3 hertz to 3 terahertz.

A fraction is a non-limiting example of a "ratio", as that term is used herein.

"RFID" means radio frequency identification.

"RF transceiver" or "radio frequency transceiver" means a transceiver that is configured to transmit and receive wireless RF signals.

"RF transmitter" means a transmitter configured to transmit a wireless RF signal. A non-limiting example of an "RF transmitter" is a transceiver that is configured to transmit a wireless RF signal.

"RF receiver" means a receiver configured to receive a wireless RF signal. A non-limiting example of an "RF receiver" is a transceiver that is configured to receive a wireless RF signal.

""RF signal" or "radio frequency signal" means a signal in the radio band of frequencies. Unless the context clearly indicates otherwise, a RF signal is wireless.

"RSS" means received signal strength, expressed as a positive number.

As used herein, the term "set" does not include a group with no elements.

Unless the context clearly indicates otherwise, "some" means one or more.

As used herein, a "subset" of a set consists of less than all of the elements of the set.

The term "such as" means for example.

"Tag" means an RFID tag.

"Transitioning between" a first state and a second state means transitioning from the first state to the second state or transitioning from the second state to the first state.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is an apparatus comprising: (a) a radio frequency (RF) transceiver; and (b) one or more computers; wherein (i) the transceiver is configured (A) to take a first set of measurements, at each frequency in a set of RF frequencies, of wireless RF radiation that propagates in a first set of environments of the transceiver and is received by the transceiver, and (B) to take a second set of measurements, at each frequency in the set of frequencies, of wireless RF radiation that propagates in a second set of environments of the transceiver and is received by the transceiver; and (ii) the one or more computers are programmed (A) to estimate, based on the first set of measurements, a first set of channel estimates in such a way that the first set of channel estimates includes at least one channel estimate for each frequency in the set of frequencies, (B) to estimate, based on the second set of measurements, a second set of channel estimates in such a way that the second set of channel estimates includes at least one channel estimate for each frequency in the set of frequencies, (C) to calculate a set of channel ratios in such a way that each channel ratio in the set of channel ratios is a fraction that has a numerator and denominator, the numerator being a channel estimate in the first set of channel estimates and the denominator being a channel estimate in the second set of channel estimates, and (D) to perform an additional calculation that is based at least in part on the channel ratios or on information derived from the channel ratios, and that recognizes, estimates or classifies (i) a physical object or physical region or (ii) an attribute or state of the physical object or the physical region. In some cases, the additional calculation comprises classifying a material of the physical object, based at least in part how permittivity of the physical object affects a frequency response measured by the transceiver. In some cases: (a) the object is a radio frequency identification ("RFID") tag; and (b) the apparatus further includes an RFID reader that is configured to transmit at a frequency that is not in the set of frequencies. In some cases, the one or more computers are programmed to feed the set of channel ratios as an input into a variational autoencoder. In some cases, the one or more computers are programmed to perform calculations that involve: (a) feeding the channel ratios as inputs into a generative model; (b) outputting, from the generative model, a set of numbers ("outputs"); (c) training a first neural network to perform a first classification task, by training on a dataset that includes the outputs or information derived at least in part from the outputs; and (d) after the first neural network is trained to perform the first classification task, training a second neural network to perform a second classification task, in such a way that weights of some but not all layers of the second neural network (i) are set equal to weights of corresponding layers of the first neural layer and (ii) after being set, remain constant during the training of the second neural network. In some cases, the one or more computers are programmed to perform calculations that involve: (a) feeding the channel ratios as inputs into a variational autoencoder; (b) outputting, from the variational autoencoder, a set of numbers ("VAE outputs"); (c) training a first neural network to perform a first classification task, by training on a dataset that includes the VAE outputs or information derived at least in part from the VAE outputs; and (d) after the first neural network is trained to perform the first classification task, training a second neural network to perform a second classification task, in such a way that weights of some but not all layers of the second neural network (i) are set equal to weights of corresponding layers of the first neural layer and (ii) after being set, remain constant during the training of the second neural network. In some cases: (a) the one or more computers are programmed (i) to perform training of a variational autoencoder, by training the autoencoder on a dataset that includes the channel ratios, (ii) to cause the transceiver to take a third set of measurements which measure a wireless RF signal that reflects from or is transmitted by the physical object, (iii) to cause the variational autoencoder, after the training (i) to take input that comprises channel ratios derived from the third set of measurements and (ii) to output a set of numbers ("VAE outputs"), and (iv) to perform a comparison, which comparison compares (i) reconstruction loss for the VAE outputs and (ii) a threshold amount; and (b) the additional calculation comprises classifying, based on the comparison, a material of the physical object. In some cases, the one or more computers are programmed to perform calculations that involve: (a) feeding the set of channel ratios as an input into a variational autoencoder; (b) causing the variational autoencoder to output numbers (each, a "VAE output"); and (c) calculating a set of products in such a way that each product in the set of products is calculated by multiplying (i) a VAE output by (ii) a channel estimate derived from a measurement. In some cases, the channel ratios encode information about the first set of environments but do not encode information about material of the object. Each of the cases described above in this paragraph is an example of the apparatus described in the first sentence of this paragraph, and is also an example of an embodiment of this invention that may be combined with other embodiments of this invention.

In some implementations, this invention is an apparatus comprising: (a) a radio frequency (RF) transceiver; and (b) one or more computers; wherein (i) the transceiver is configured to take measurements that measure an antenna's frequency response, which frequency response (A) comprises amplitude and phase of radiation that is reflected or received by the antenna at each frequency in a set of frequencies, and (B) depends in part on permittivity of a solid or liquid material that is not in direct physical contact with the antenna and that is within a distance from the antenna, which distance is less than two wavelengths of the highest frequency in the set of frequencies, and (ii) the one or more computers are programmed to identify, based on the measurements (A) the solid or liquid material, (B) a property of the solid or liquid material, or (C) a component of the solid or liquid material. In some cases, the transceiver is configured to transmit the radiation at each frequency in the set of frequencies, by performing frequency hopping. In some cases, the transceiver is configured to transmit the radiation at each frequency in the set of frequencies, by performing orthogonal frequency-division multiplexing. In some cases, the antenna is part of a radio frequency identification tag. In some cases: (a) the measurements include a group of multiple subsets of the measurements; and (b) the one or more computers are programmed to cause the transceiver to take the measurements in such a way that each specific subset in the group is taken while the antenna is in a specific environment, which specific environment is different than that for any other subset in the group. In some cases, the one or more computers are programmed to perform calculations that involve: (a) feeding the measurements or information derived from the measurements as inputs into a variational autoencoder; (b) outputting, from the variational autoencoder, a set of numbers ("VAE outputs"); and (c) training a neural network on a database, which database includes the VAE outputs. In some cases, the one or more computers are programmed to perform calculations that involve: (a) feeding the measurements or information derived from the measurements as inputs into a variational autoencoder; (b) outputting, from the variational autoencoder, a set of numbers ("VAE outputs"); (c) training a first neural network to perform a first classification task, by training on a dataset that includes the VAE outputs or information derived at least in part from the VAE outputs; and (d) after the first neural network is trained to perform the first classification task, training a second neural network to perform a second classification task, in such a way that weights of some but not all layers of the second neural network (i) are set equal to weights of corresponding layers of the first neural layer and (ii) after being set, remain constant during the training of the second neural network. In some cases: (a) the antenna is a part of a radio frequency identification ("RFID") tag; (b) the transceiver is configured to transmit the radiation at each frequency in the set of frequencies in such a way that (i) the set of frequencies has a first bandwidth of at least 100 MHz and (ii) the radiation travels to the RFID tag, reflects from the RFID tag, and travels back to the transceiver; and (c) the apparatus further includes an RFID reader that is configured to transmit a wireless RF signal to the RFID tag at a frequency that is not in the set of frequencies, which wireless RF signal provides wireless power to the RFID tag. Each of the cases described above in this paragraph is an example of the apparatus described in the first sentence of this paragraph, and is also an example of an embodiment of this invention that may be combined with other embodiments of this invention.

In some implementations, this invention is an apparatus comprising: (a) a radio frequency (RF) transceiver; and (b) one or more computers; wherein the one or more computers are programmed (i) to cause the transceiver to take a first set of measurements that measure frequency responses that depend in part on permittivity of a first object, (ii) to perform training of a variational autoencoder, by training the autoencoder on a dataset that includes the first set of measurements or information derived from the first set of measurements, (iii) to cause the transceiver to take a second set of measurements that measure frequency responses that depend in part on permittivity of a second object, (iv) to cause the variational autoencoder, after the training (A) to take, as input, a set of channel ratios derived from the second set of measurements and (B) to output a set of numbers ("VAE outputs"), (v) to perform a comparison, which comparison compares (A) reconstruction loss for the VAE outputs and (B) a threshold amount, and (vi) to determine, based on the comparison, whether a material of the second object is in a same class as a material of the first object. In some cases: (a) the first set of measurements include a group of multiple subsets of the measurements; and (b) the one or more computers are programmed to cause the transceiver to take the first set of measurements in such a way that each specific subset in the group, is taken while the antenna is in a specific environment, which specific environment is different than that for any other subset in the group. In some cases: (a) the first set of measurements includes a first subset of measurements taken in a first subset of environments of the transceiver and a second subset of measurements taken in a second set of environments of the transceiver; and (b) the one or more computers are programmed (i) to calculate, based on the first subset of measurements, a first set of channel estimates in such a way that the first set of channel estimates includes at least one channel estimate for each frequency in the set of frequencies, (ii) to calculate, based on the second subset of measurements, a second set of channel estimates in such a way that the second set of channel estimates includes at least one channel estimate for each frequency in the set of frequencies, and (iii) to calculate the set of channel ratios in such a way that each channel ratio in the set of channel ratios is a fraction that has a numerator and denominator, the numerator being a channel estimate in the first set of channel estimates and the denominator being a channel estimate in the second set of channel estimates. Each of the cases described above in this paragraph is an example of the apparatus described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. An apparatus comprising:
   (a) a radio frequency (RF) transceiver; and
   (b) one or more computers;
   wherein
   (i) the RF transceiver is configured
      to take a first set of measurements, which first set of measurements comprises measurements taken, at each frequency in a set of RF frequencies, of wireless RF radiation that reflects from a radio frequency identification (RFID) tag during a first period of time in which the RFID tag is attached to an external surface of a closed container and both the closed container and the RFID tag are located, in a first set of environments
      to take a second set of measurements, which second set of measurements comprises measurements taken, at each frequency in the set of RF frequencies, of wireless RF radiation that reflects from the RFID tag during a second period of time in which the RFID tag is attached to the external surface of the closed container and both the closed container and the RFID tag are located, in a second set of environments
      to take a third set of measurements, which third set of measurements comprises measurements taken, at each frequency in the set of RF frequencies, of wireless RF radiation that reflects from the RFID tag during a third period of time in which the RFID tag is attached to the external surface of the closed container; and
   (ii) the one or more computers are programmed
      to estimate, based on the first set of measurements, a first set of channel estimates in such a way that the first set of channel estimates includes at least one channel estimate for each frequency in the set of RF frequencies,
      to estimate, based on the second set of measurements, a second set of channel estimates in such a way that the second set of channel estimates includes at least one channel estimate for each frequency in the set of RF frequencies,
      to calculate a set of channel ratios in such a way that each particular channel ratio in the set of channel ratios is calculated as $$P_k = \frac{h_{k,MPATH}}{h_{k,LOS}}$$

where $P_k$ is the particular channel ratio and is calculated for a particular frequency $f_k$ in the set of wireless RF frequencies, where $h_{k,MPATH}$ is a channel estimate that is in the first set of channel estimates and is calculated for the particular frequency $f_k$, and where $h_{k,LOS}$ is a channel estimate that is in the second set of channel estimates and is calculated for the particular frequency $f_k$, and to perform, based on the third set of measurements, an additional computation to recognize, to estimate, or to classify contents of the closed container, which additional computation is performed with a first neural network that has been trained on a training dataset, which training dataset (I) includes the set of channel ratios, or (II) includes synthetic channel estimates, which synthetic channel estimates are calculated based on the set of channel ratios or based on synthetic channel ratios that are generated from the set of channel ratios.

2. The apparatus of claim 1, wherein the apparatus is configured to take the first and second sets of measurements in such a way that the first and second sets of measurements are impacted by relative permittivity of the contents of the closed container.

3. The apparatus of claim 1, wherein the apparatus further includes an RFID reader that is configured to transmit at a frequency that is not in the set of RF frequencies.

4. The apparatus of claim 1, wherein the one or more computers are programmed:
   to feed the set of channel ratios as an input into a variational autoencoder, which variational autoencoder is not the first neural network;
   to generate, with the variational autoencoder, the synthetic channel ratios; and
   to calculate the synthetic channel estimates, based on the synthetic channel ratios.

5. The apparatus of claim 1, wherein the training dataset includes the synthetic channel estimates and wherein the one or more computers are programmed to perform calculations that involve:
   feeding the channel ratios as inputs into a generative model, which generative model is not the first neural network;
   outputting, from the generative model, the synthetic channel ratios;
   calculating the synthetic channel estimates, based on the synthetic channel ratios;
   training the first neural network on the training dataset; and
   after the first neural network is trained, training a second neural network in such a way that weights of some but not all layers of the second neural network (A) are set equal to weights of corresponding layers of the first neural network and (B) after being set, remain constant during the training of the second neural network.

6. The apparatus of claim 1, wherein the training dataset includes the synthetic channel estimates and wherein the one or more computers are programmed to perform calculations that involve:
   feeding the channel ratios as inputs into a variational autoencoder, which variational autoencoder is not the first neural network;
   outputting, from the variational autoencoder, the synthetic channel ratios;
   calculating the synthetic channel estimates, based on the synthetic channel ratios;
   training the first neural network on the training dataset; and
   after the first neural network is trained, training a second neural network in such a way that weights of some but not all layers of the second neural network (A) are set equal to weights of corresponding layers of the first neural network and (B) after being set, remain constant during the training of the second neural network.

7. The apparatus of claim 1, wherein the training dataset includes the set of channel ratios, and wherein the one or more computers are programmed
- to perform training of a variational autoencoder, which variational encoder is the first neural network, by training the variational autoencoder on the training dataset that includes the set of channel ratios,
- to cause the variational autoencoder, after the training, to take input that comprises additional channel ratios derived from the third set of measurements and to output additional synthetic channel ratios, and
- to determine whether reconstruction loss for the additional synthetic channel ratios is greater than a threshold amount.

8. The apparatus of claim 1, wherein the one or more computers are programmed to calculate each of the synthetic channel estimates by multiplying one of the synthetic channel ratios times a channel estimate derived from a measurement.

9. The apparatus of claim 1, wherein the set of channel ratios encode information about the first set of environments but do not encode information about the contents of the closed container.

* * * * *